US012606379B2

(12) United States Patent
Simpson et al.

(10) Patent No.: US 12,606,379 B2
(45) Date of Patent: Apr. 21, 2026

(54) AUTOMATIC STORAGE AND RETRIEVAL SYSTEM HAVING STAGING AND SEQUENCING BUFFER LOCATIONS AND SEGREGATED STORAGE

(71) Applicant: Symbotic LLC, Wilmington, MA (US)

(72) Inventors: David B. Simpson, Fort Mill, SC (US); William J. Fosnight, Windham, NH (US); John G. Lert, Jr., Wakefield, MA (US)

(73) Assignee: Symbotic LLC, Wilmington, MA (US)

( * ) Notice: Subject to any disclaimer, the term of this patent is extended or adjusted under 35 U.S.C. 154(b) by 753 days.

(21) Appl. No.: 17/957,227

(22) Filed: Sep. 30, 2022

(65) Prior Publication Data

US 2023/0095494 A1 Mar. 30, 2023

Related U.S. Application Data

(60) Provisional application No. 63/250,887, filed on Sep. 30, 2021.

(51) Int. Cl.
| | |
|---|---|
| *B65G 1/137* | (2006.01) |
| *B65G 1/04* | (2006.01) |
| *B65G 1/06* | (2006.01) |
| *G06Q 10/087* | (2023.01) |

(52) U.S. Cl.
CPC ......... *B65G 1/1378* (2013.01); *B65G 1/0485* (2013.01); *B65G 1/0492* (2013.01); *B65G 1/065* (2013.01); *B65G 1/137* (2013.01); *G06Q 10/087* (2013.01); *B65G 2201/0258* (2013.01)

(58) Field of Classification Search
CPC .... B65G 1/1378; B65G 1/137; B65G 1/0485; B65G 1/0492; B65G 1/065; B65G 2201/0258; B65G 1/0478; G06Q 10/087
See application file for complete search history.

(56) References Cited

U.S. PATENT DOCUMENTS

| | | | |
|---|---|---|---|
| 11,072,494 B2 | 7/2021 | Hognaland | |
| 2018/0178979 A1* | 6/2018 | Bretz | B65G 1/0407 |
| 2019/0062051 A1* | 2/2019 | Warhurst | B25J 5/02 |
| 2019/0176323 A1 | 6/2019 | Coady et al. | |
| 2020/0319648 A1* | 10/2020 | Eckman | G01C 21/206 |

(Continued)

FOREIGN PATENT DOCUMENTS

| | | |
|---|---|---|
| DE | 102016002760 | 9/2017 |
| DE | 102017222801 | 6/2019 |

(Continued)

OTHER PUBLICATIONS

Invitation to Pay Additional Fees with Partial International Search dated Feb. 3, 2023, International Patent Application No. PCT/US2022/045440.

(Continued)

*Primary Examiner* — Thomas Randazzo
(74) *Attorney, Agent, or Firm* — Perman & Green, LLP

(57) ABSTRACT

An order fulfillment system includes a storage structure for storing totes, workstations for processing customer orders and a staging and sequencing buffer having staging locations for storing the totes. The staging and sequencing buffer provides a buffer for totes as mobile robots transfer totes from the storage structure and to the one or more workstations.

20 Claims, 27 Drawing Sheets

(56)  References Cited

U.S. PATENT DOCUMENTS

| 2022/0289479 A1 * | 9/2022 | Traina ................. | B65G 1/0492 |
| 2023/0271785 A1 * | 8/2023 | Gravelle ............. | G06Q 10/087 |

FOREIGN PATENT DOCUMENTS

| EP | 3863947 | 8/2021 |
| WO | 2016139003 | 9/2016 |
| WO | 2020047313 | 3/2020 |

OTHER PUBLICATIONS

English language Abstract and Bibliographic data for DE102017222801 published Jun. 19, 2019.
English language Abstract and Bibliographic data for DE102016002760 published Sep. 7, 2017.
English language Abstract and Bibliographic data for WO2016139003 published Sep. 9, 2016.

* cited by examiner

AUTOMATIC STORAGE AND RETRIEVAL SYSTEM HAVING STAGING AND SEQUENCING BUFFER LOCATIONS AND SEGREGATED STORAGE

PRIORITY DATA

The present application claims priority to U.S. Provisional Patent Application No. 63/250,887, filed on Sep. 30, 2021, entitled "AUTOMATIC STORAGE AND RETRIEVAL SYSTEM HAVING STAGING AND SEQUENCING BUFFER LOCATIONS AND SEGREGATED STORAGE", which application is incorporated by reference herein in its entirety.

BACKGROUND

An order fulfillment system for use in supply chains, for example in retail supply chains, may fulfill orders for individual product units or goods. Conventional systems may transfer totes including inventory using mobile robots between a storage structure and one or more workstations where orders are processed. Given the large volume of moving mobile robots, congestion can often occur as the mobile robots transfer totes between the storage structure and the one or more workstations. This congestion, if not managed, may reduce the overall efficiency of the order fulfillment facility

BRIEF DESCRIPTION OF THE DRAWINGS

Embodiments of the present technology will now be described with reference to the figures which include the following.

DETAILED DESCRIPTION

Embodiments of the present technology will now be described with reference to the figures, which in general relate to an automatic storage and retrieval system having staging and sequencing locations and further to an automatic storage and retrieval system having dedicated routing paths for mobile robots. The embodiments described enable simplifying software complexity, for example, by simplifying or limiting the need for traffic management. Further and as will be described, the embodiments are intended to enable efficient transport of mobile robots to and from storage locations with simplified sequence constraints, scheduling constraints and congestion points.

It is understood that the present embodiments may be embodied in many different forms and should not be construed as being limited to the embodiments set forth herein. Rather, these embodiments are provided so that this disclosure will be thorough and complete and will fully convey the invention to those skilled in the art. Indeed, the embodiments are intended to cover alternatives, modifications and equivalents of these embodiments, which are included within the scope and spirit of the invention as defined by the appended claims. Furthermore, in the following detailed description, specific details are set forth in order to provide an understanding of the present embodiments.

The terms "top" and "bottom," "upper" and "lower" and "vertical" and "horizontal" as may be used herein are by way of example and illustrative purposes only and are not meant to limit the description of the embodiments inasmuch as the referenced item can be exchanged in position and orientation. Also, as used herein, the terms "substantially" and/or "about" mean that the specified dimension or parameter may be varied within an acceptable manufacturing tolerance for a given application. In one non-limiting embodiment, the acceptable manufacturing tolerance is ±0.25%.

For purposes of this disclosure, a connection may be a direct connection or an indirect connection (e.g., via one or more other parts). In some cases, when a first element is referred to as being connected, affixed or coupled to a second element, the first and second elements may be directly connected, affixed or coupled to each other or indirectly connected, affixed or coupled to each other. When a first element is referred to as being directly connected, affixed or coupled to a second element, then there are no intervening elements between the first and second elements (other than possibly an adhesive or weld used to connect, affix or couple the first and second elements).

Figure 1A:
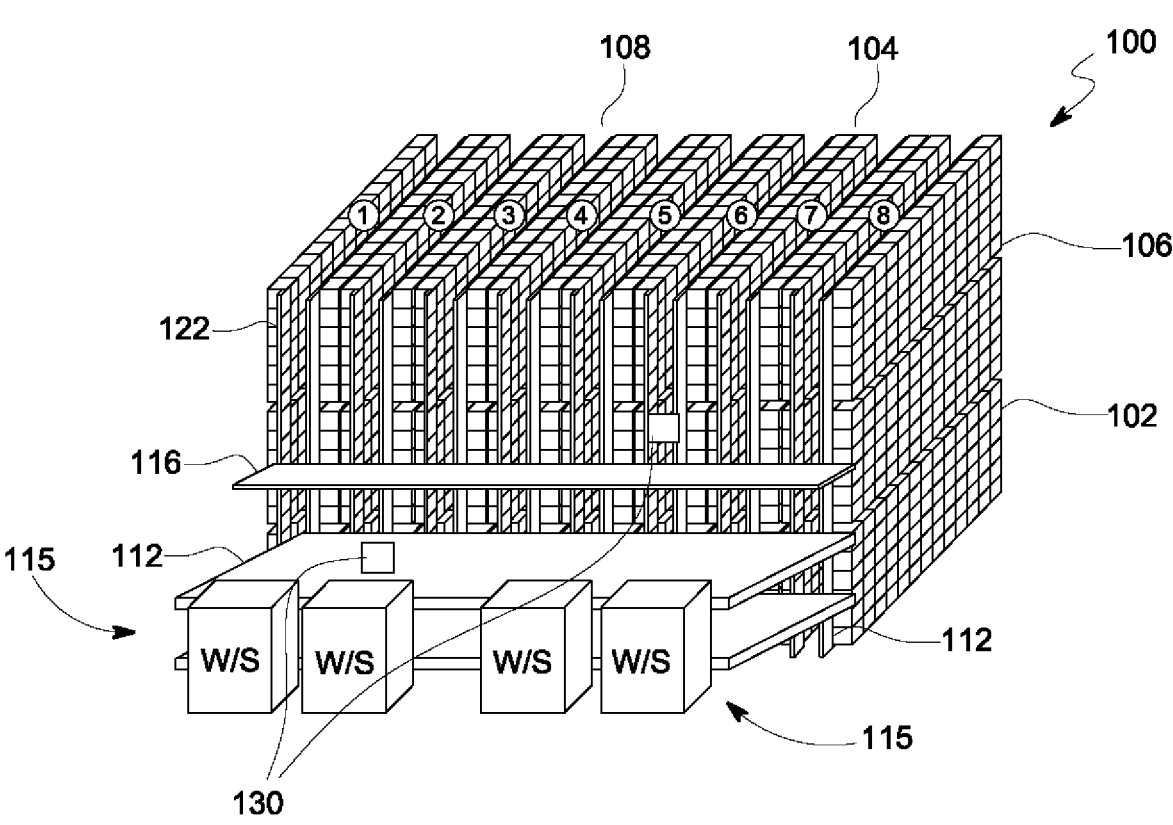
FIGS. 1A and 1B show perspective and schematics views of a conventional order fulfillment facility.

FIG. 1A shows a perspective view of a current order fulfillment facility 100 showing a storage structure 102 including a number of bays 104 of storage locations 106. The bays 104 each include a y-z array of storage locations 106 in horizontal rows and level changing towers along the rows which in embodiments may be vertical towers. Mobile robots 130 may travel between storage levels in the z-direction within the level changing towers. The pairs of bays 104 that are arranged to face each other, separated by aisles 108. An aisle 108 may have a width such that a mobile robot 130 traveling within an aisle 108 may transfer containers to the bays 104 on either side of the aisle 108.

The order fulfillment facility 100 includes decks 112 spaced apart at different vertical levels of the storage structure 102. The decks 112 may be arranged in pairs and extend between the aisles so that robots 130 can maneuver in the x-y plane of each deck to travel between different aisles. One of the decks 112 or suitable supporting structure may also extend into the respective aisles to allow technicians to walk into an aisle 108 to service components within the aisle. The order fulfillment facility 100 also includes an express deck 116 arranged to extend between the aisles so that robots 130 can maneuver in the x-y plane to travel between different aisles. Decks 112 may be provided for transit of Bots 130 between aisles or for transit of Bots 130 between aisles and workstations (such as workstations 115). Here, Express deck(s) 116 may be provided for x-direction movement, transit deck(s) 112 may be provided for workstation return and transit deck(s) 112 may be provided for staging and sequencing locations (buffer locations) feeding workstations.

FIG. 1A also shows examples of workstations 115. Each workstation is equipped to receive pairs of mobile robots. A first mobile robot at a station carries a product tote, in combination with successive mobile robots with items for fulfilling product requests to make up an order. A second mobile robot at the station carries an order tote, in combination with successive mobile robots as required, within which items from the product totes are placed to fulfill product requests to make up an order having one or more order totes. Workers at a workstation manually transfer items from a product tote to an order tote under guidance of an inventory control system at the workstation.

As noted above, the order fulfillment facility 100 may further include a number of mobile robots 130 for transferring totes or other product or order containers to and from workstations 115 and storage locations 106 in the bays 104. The mobile robots 130 may be self-guided and/or rail-guided so as to move horizontally and vertically within aisles 108 to transfer totes or other product containers between the mobile robots 130 and storage locations 106. For example, a track system including horizontal rails may be affixed to the bays 104 at different vertical levels. The horizontal rails provide access to storage shelves on either side of an aisle 108 in the x-direction on a given level. The bays 104 include vertical level changing towers 122 within which the mobile robots may travel vertically in the z-direction between levels of storage locations 106.

Figure 1B:
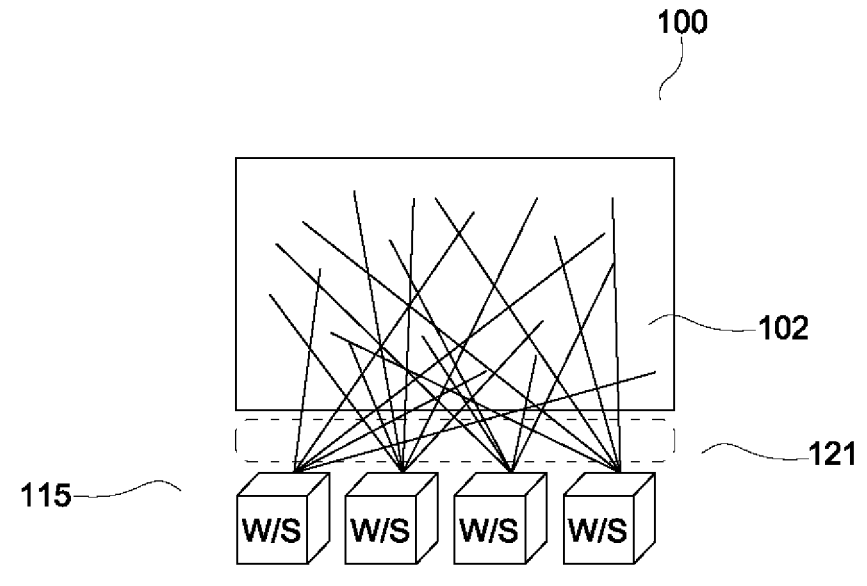

FIG. 1B shows a partial view of a current order fulfillment facility 100 that includes a storage structure 102 and workstations 115. The mobile robots 130 (not shown) attempt to traverse at a steady flow between any storage location within the storage structure 102 and any workstation 115. As noted in the Background section, the mobile robots 130 can maneuver in the x-y plane of each deck 112 resulting in congestion 121 of the mobile robots at the workstations 115. The congestion 121, if not managed, may reduce the overall efficiency of the current order fulfillment facility 100. A challenge in a discrete pick design is the sequenced, steady flow of product from any location in the storage block 102 to any workstation 151 where the flow of product must be efficiently sequenced with steady flow to and from any location in system 100. In the disclosed embodiment and as will be described, staging and sequencing towers are disclosed having preferred routing of mobile robots and storage locations for staging and sequencing of totes to facilitate management of congestion.

Further details of the workstations, storage structure and mobile robot which may be used are described for example in the following U.S. patents and patent applications: U.S. Pat. No. 9,139,363, entitled "Automated System For Transporting Payloads," issued Sep. 22, 2015; U.S. Pat. No. 10,435,241, entitled "Storage and Retrieval System," issued Oct. 8, 2019; and U.S. Pat. No. 11,142,398, entitled "Order Fulfillment System," issued Oct. 12, 2021. Each of these patents and applications are incorporated by reference herein in their entirety.

FIGS. 2A-2D are schematic illustrations and perspective views of an order fulfillment facility 100 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used. It is also noted that while X, Y and Z axis are referred to, reference of these axes may have any suitable directional identifiers. Referring to FIGS. 2A-2D, the order fulfillment facility 100 may include a storage structure 102, transit deck pairs 117, staging and sequencing towers 120 and workstations 115. The storage structure 102 may include a number of bays 104 of storage locations 106. The bays 104 each may include an y-z array of storage locations 106 and horizontal rows and level changing towers 122 along the rows which in embodiments may be vertical towers. The transit deck pairs 117 may extend between the aisles 108 so that the mobile robots 130 (not shown) can maneuver in the x-y plane providing one way transit of the mobile robots 130 between the storage structure 102 and the staging and sequencing towers 120. Here, decks 117 may be narrow, one-way transit decks to segment z-axis and x-axis throughput volumes yielding a compact design with maintenance access from a platform. The staging and sequencing towers 120 may have staging or storage shelves 124 similar to those storage locations 106 and vertical level changing towers 125. In one aspect, staging or storage locations 124 may be located on both sides of the vertical level changing towers 125 and in alternative embodiments the staging locations 124 may be located on either side of the vertical level changing towers 125. The workstations 115 may be located at the ground level of the staging sequencing towers 120 and may be configured to receive the mobile robots 130 from the staging and sequencing towers 120. In alternative embodiments, the workstations 115 may be interfaced with the staging and sequencing towers 120 at any level. The workstations 115 may be configured to receive the mobile robots 130 from the staging and sequencing towers 120 and return the mobile robots 130 to the storage structure 102 via secondary vertical level changing towers 128 and the transit deck pairs 117. Here, the staging and sequencing towers 120 are coupled to respective workstations 115 to remove sequencing constraints from the storage structure 102. In the embodiment shown, multiple transit planes 117 are provided to spread throughput over multiple levels. Further, the buffer/sequencer 120 may connect workstations 115 to the transit planes 117 and allows the subsystems to work substantially independent of one another as will be described in greater detail.

Figure 2A:
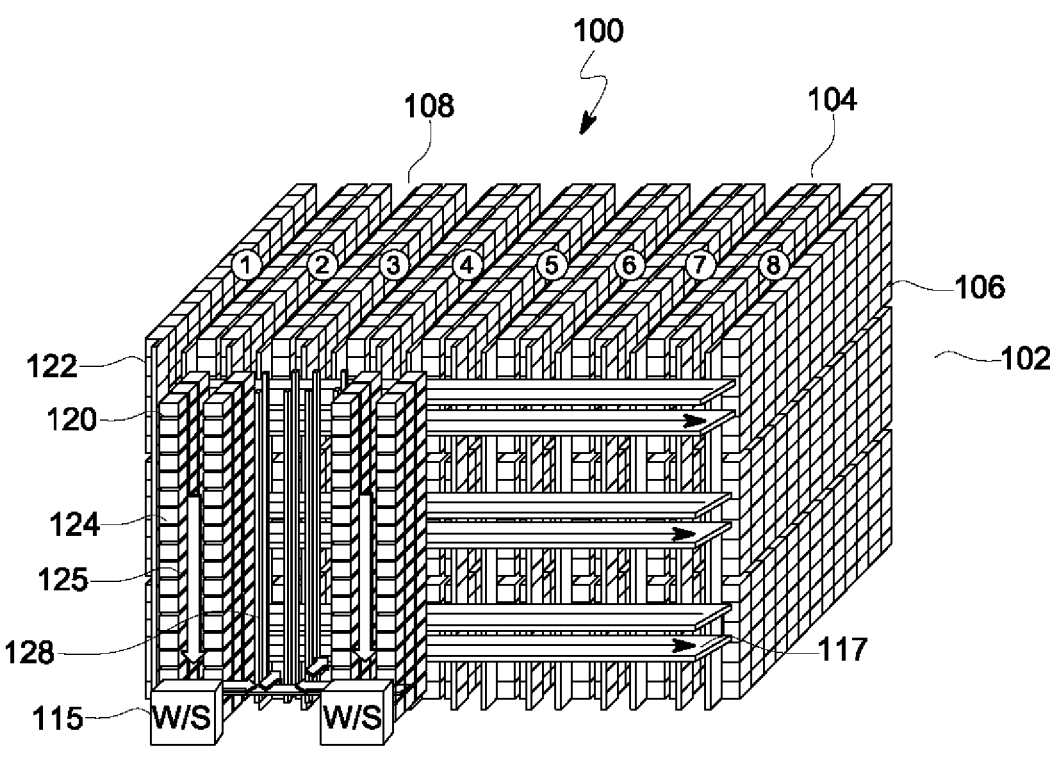
FIGS. 2A-2D are schematic illustrations and perspective views of an order fulfillment facility according to embodiments of the present technology.
Figure 2B:
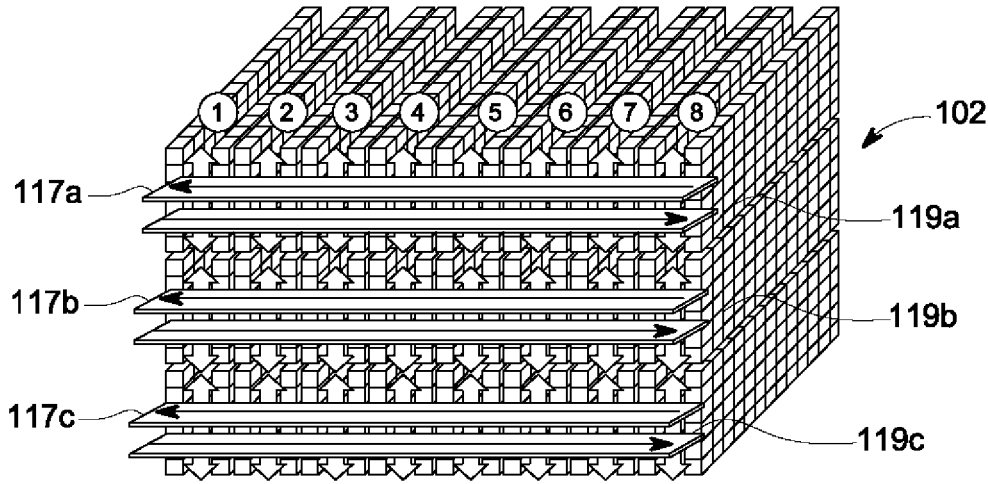

Referring now to FIG. 2B, the storage structure 102 of the order fulfillment facility 100 may be divided into multiple zones 119. Dividing throughput across multiple zones removes I/O constraints from the storage system and increases throughput capacity. Each zone 119 may be a three-dimensional array of storage locations 106. In one aspect, the zone 119 may be a 13×6×16 array and in alternative embodiments the zone 119 may be of any suitable size. Each zone 119 may have one set of transit deck pairs 117 and in alternative embodiments each zone 119 may have any suitable number of transit deck pairs 117. Here, 2 X axis planes are shown provided within a tier group of 6 levels. Further, within the same cluster (8 aisles with 6 levels), the decks provide redundancy as needed to go between clusters. As the direction of opposing x flows is dedicated by deck pair 117 as shown, there are no sequence restrictions or timing constraints within this subsystem providing a significant division of throughput resulting in single, bi-directional vertical towers.

Figures 2C, 2D:
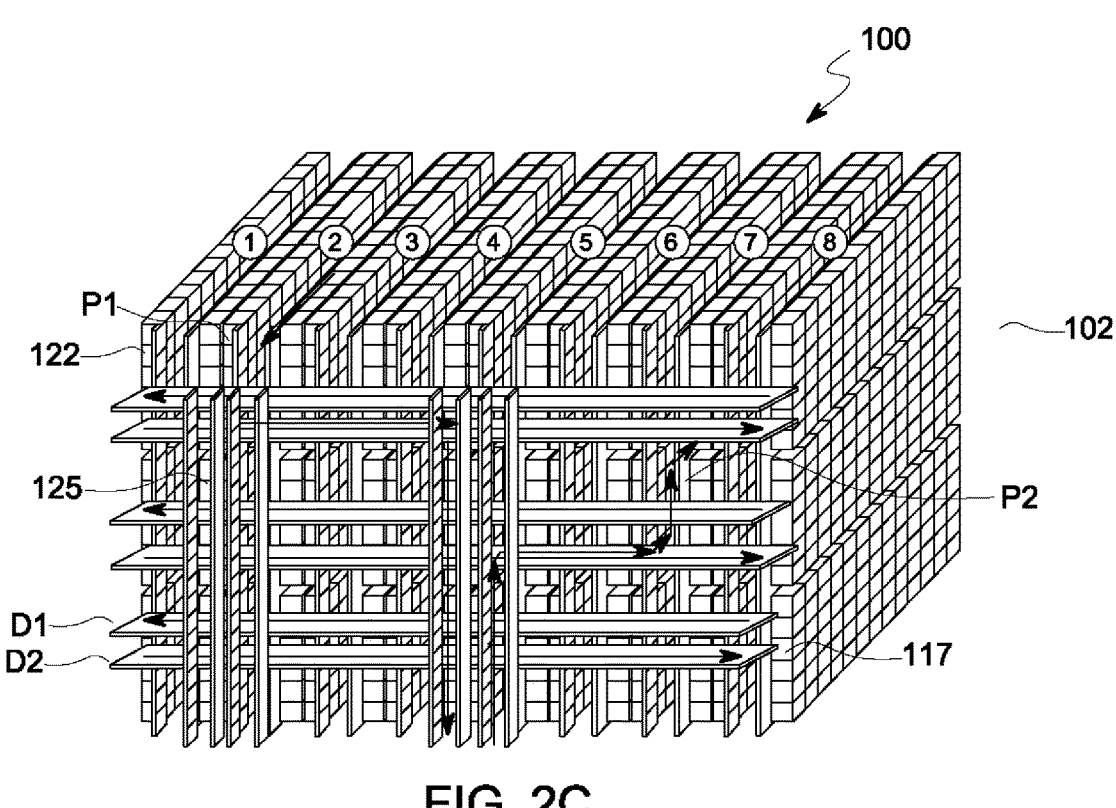

Referring now to FIG. 2C, a path P1 or P2 may be established for a mobile robot 130 (not shown) that flows from any location 106 in the storage structure 102 to any workstation 115 or from any workstation 115 to any location 106 in the storage structure 102. For example, path P1 begins at a location 106 within zone 119a, aisle 2, and then progresses to vertical level changing tower 122, then to the lower transit deck 117 of zone 119a, then to vertical level changing tower 125 and ending at the workstation 115. Path P2 begins at workstation 115, and then progresses to vertical level changing tower 125, then to lower transit deck 117 of zone 119b, then to vertical level changing tower 122 and ending at a location 106 within zone 119b, aisle 7. The paths P1 and P2 may be followed by a mobile robot 130 where the mobile robot 130 may be carrying a product tote or an order tote. As discussed above and shown by paths P1 and P2, the mobile robot 130 may only traverse in one direction while on the transit deck 117. The same paths P1 and P2 may be traversed by a single mobile robot at different times, or the paths P1 and P2 may be followed by two different mobile robots at the same time.

Referring now to FIG. 2D, in one aspect, the mobile robot 130 may transition from the staging and sequencing towers 120 over a transit deck 117 and onto the vertical level changing tower 122 at any desired aisle 108 within the storage structure 102. The vertical level changing tower 122 may position the mobile robot 130 in the Z direction at any desired level and the mobile robot 130 may transition down the aisle 108 to any desired location 106 within the storage structure 102.

Figure 3A:
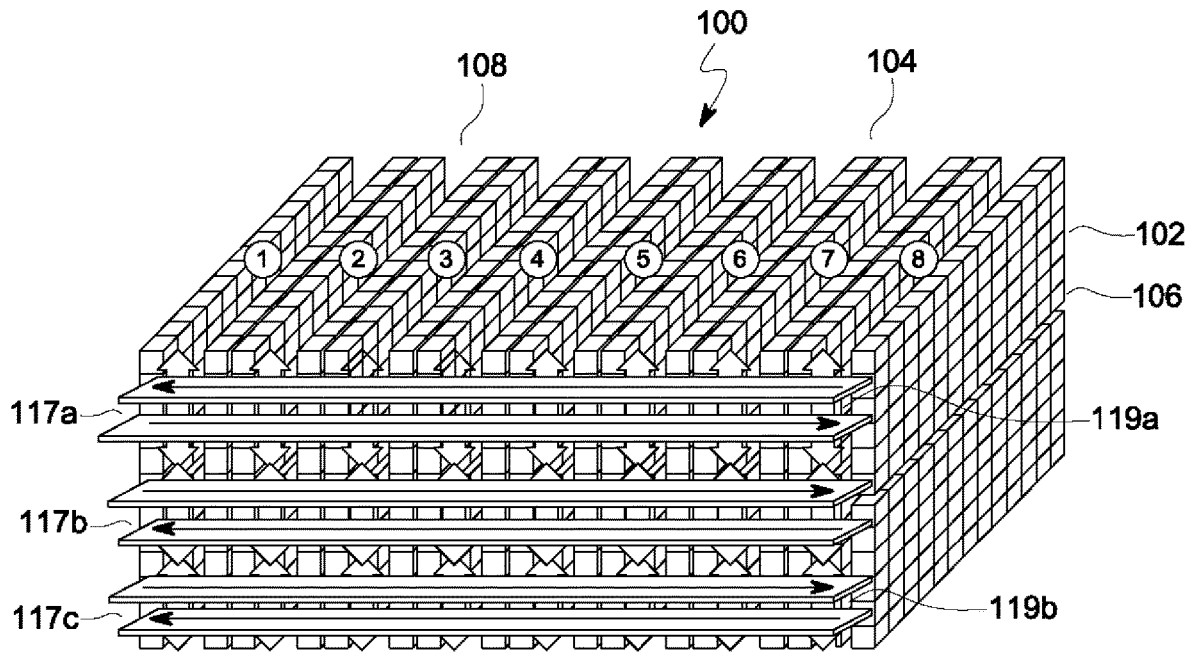
FIGS. 3A-D are schematic illustrations and perspective views showing further aspects of an order fulfillment facility according to embodiments of the present technology.

FIGS. 3A-D are schematic illustrations and perspective views of an order fulfillment facility 100 in accordance with aspects of the disclosed embodiment. Referring to FIG. 3A, in one aspect, the storage structure 102 of the order fulfillment facility 100 may have two zones 119a and 119b and three sets of transit deck pairs 117a, 117b and 117c. FIG. 3A shows an option having additional transit levels with logical boundaries between them. For example, as seen in FIG. 3A, each transit deck pair 117 covers 4 levels instead of 6 levels in contrast to FIG. 2B where each transit deck pair 117 covers 6 levels. In alternative embodiments the storage structure 102 of the order fulfillment facility 100 may have any suitable number of zones 119 and sets of transit deck pairs 117. In one aspect, the transit deck pairs 117 may service one zone 119 and in alternative embodiments the transit deck pairs 117 may service more than one zone 119. In one aspect, the vertical level changing tower 122 may traverse a single zone and in other embodiments the vertical level changing tower 122 may traverse more than one zone 119 and in additional embodiments the vertical level changing tower 122 may traverse all zones 119. The selection of the number of transit deck pairs 117 to the number of zones 119 may result in a desired throughput of mobile robots 130 within the storage structure 102.

Figure 3B:
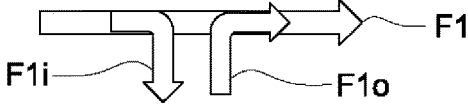
Figure 3C:
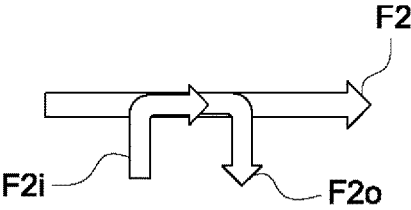

Referring now to FIGS. 3B-C, the flows F1 and F2 of mobile robots 130 (not shown) on a transit deck 117 may be in one direction on the X-Y plane. The flows F1 and F2 may each have an inbound flow F1$i$ and F2$i$ and an outbound flow F1$o$ and F2$o$ respectively. Flow F1 may have the inbound flow F1$i$ that creates an open window for the outbound flow F1$o$ while alternatively the flow F2 may have an inbound flow F2$i$ that compromises the outbound flow F2$o$. The outbound flow F2$o$ may have to wait until the inbound flow F2$i$ has transitioned off of the transit deck 117 before it may proceed. FIGS. 3B-C show example potential aisle crossing I/O bottlenecks where with one-way transits, half of the I/O's may be each of these. FIG. 3A shows a non-overlap flow where inbound traffic creates a window for outbound traffic. FIG. 3B shows an overlap flow where outbound traffic compounds the throughput of inbound traffic due to the overlap of the traffic patterns. With any tote to any workstation, more volume crosses the center territory decks where paired, one-way transit decks force loop back (overlap) of inbound/outbound loads may reduce system throughput.

Figure 3D:
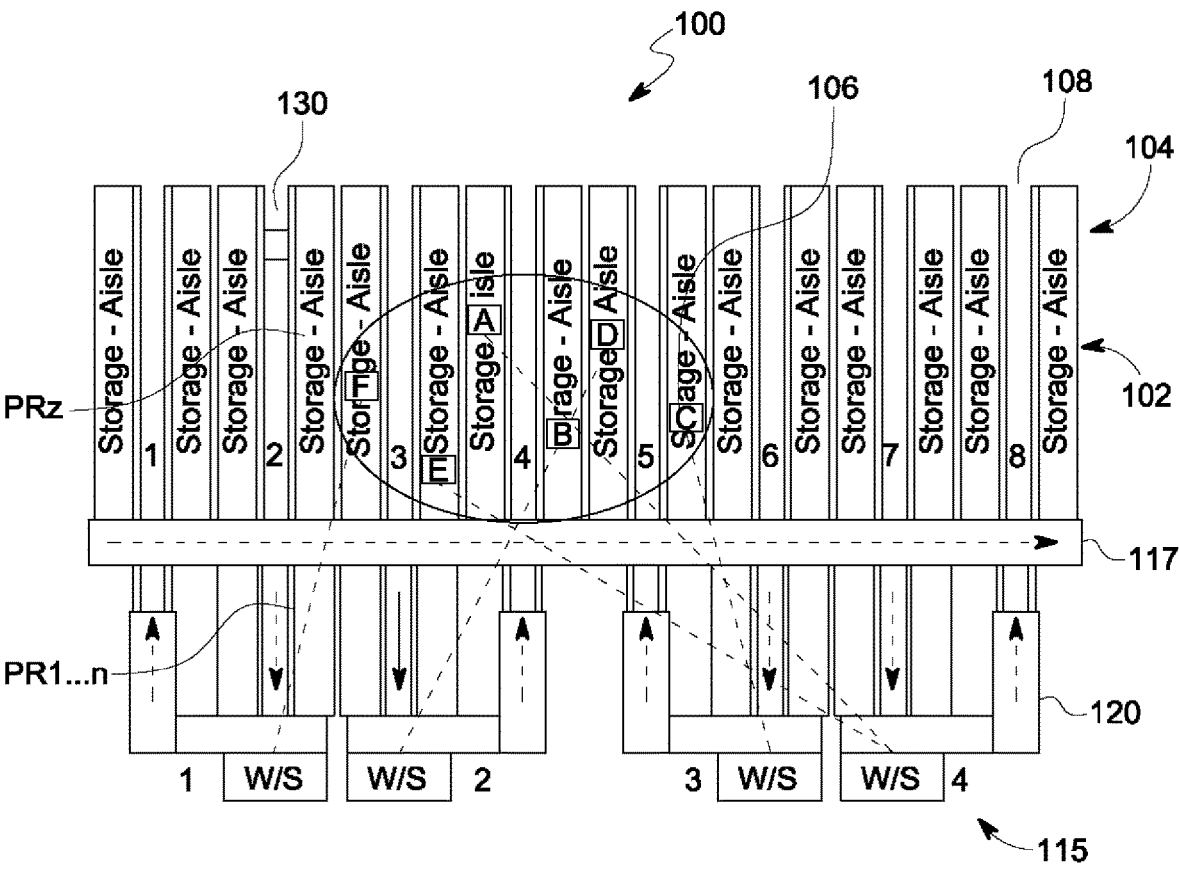

Referring now to FIG. 3D certain locations 106 within the storage structure 102 may be designated as preferred zones PRz. The preferred zones PRz may be based upon certain demand characteristics for the products located at the location 106. In one aspect there may be one preferred zone PRz and in alternative embodiments there may be any suitable number of preferred zones. As a mobile robot 130 completes work at the workstation 115, the order fulfillment facility 100 may analyze demand for products at locations 106 within each preferred zone PRz. The mobile robot 130 may be deployed to a location 106 within the first preferred zone. Alternatively if there is no demand for products in the first preferred zone PRz the mobile robot 130 may be deployed to a location 106 within a lower preferred zone PRz. Priority levels PR1 . . . n may be assigned to locations 106 within the storage structure 102. The priority levels PR1 . . . n of the locations 106 may be based upon certain demand characteristics for the products located at the location 106 and whether there is an acceptable service window. The mobile robot 130 may be deployed to a location 106 with the highest priority level and the next mobile robot 130 may be deployed to a location 106 with the next highest priority level PR1 . . . n.

An example sequence may be where a Bot completes work at a workstation, the system then seeks demand for source inventory in the closest preferred zone with the highest demand that is within and acceptable service window. If no work is found then the system may seek demand for source inventory in next preferred zone and so on to less preferred zones. To reduce sequence congestion downstream, the highest priority item within the preferred zone may get selected (highest priority=next in sequence within the subset).

Figures 4A, 4B:
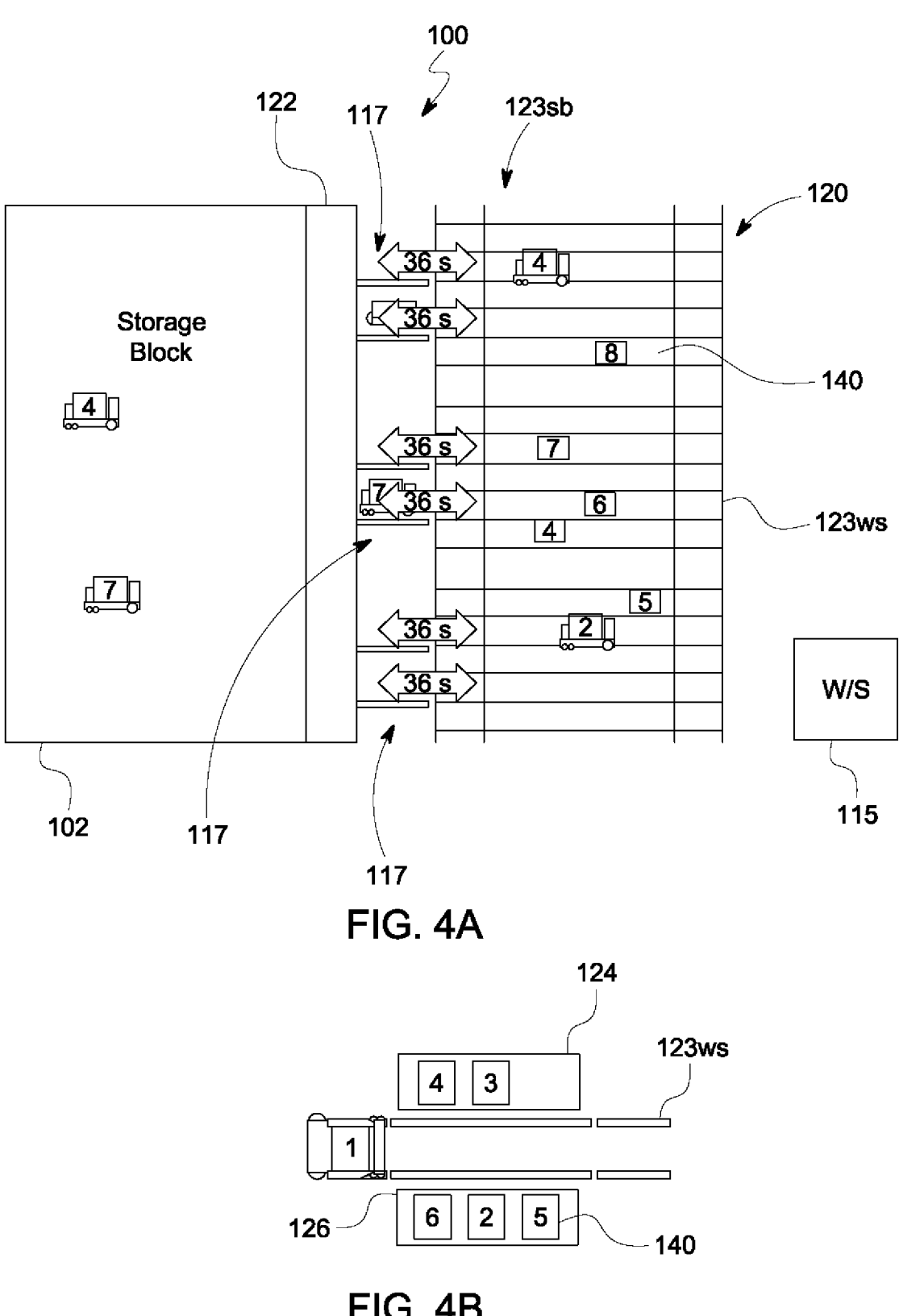
FIGS. 4A-B are schematic illustrations showing further aspects of an order fulfillment facility according to embodiments of the present technology.

FIGS. 4A-B are schematic illustrations of an order fulfillment facility 100 in accordance with aspects of the disclosed embodiment having workstation buffers utilizing bots that swap loads. Here, initial delivery of totes by bots may be in any sequence. As additional totes arrive, the bot will deposit its current tote and pickup a nearby tote that is next in sequence to the workstation. This load swap sequencing allows optimization of the most efficient moves to and from storage. Referring to FIG. 4A, the staging and sequencing tower 120 may receive product totes 140 from the storage structure 102. Mobile robot 130 may deliver product totes 140 from the storage structure 102 in any sequenced order. Delivery of product totes 140 to the workstation 115 may be optimized by swapping newly arriving product totes 140 with previously staged product totes 140. The mobile robot 130 may arrive to an unoccupied staging location and deposit the product tote 140 and then the mobile robot 130 may move to an occupied staging location and retrieve the product tote 140 (for example, the next highest priority product tote). The product tote may then be delivered to the workstation 115. In one aspect the mobile robots 130 are transferring product totes 140 and in another aspect the mobile robots 130 are sequencing order totes 140. A mobile robot 130 carrying a product tote 140 may transition from a location 106 within the storage structure 102 to the vertical level changing tower 122, then transition to a transit deck 117, then transition to the vertical level changing tower 123sb and then transition to a staging shelf 124. Referring now to FIG. 4B the staging shelf 24 may have n locations where n−1 locations may be occupied at one time. The staging shelves 124 may have at least one location unoccupied in order to swap a product tote 140. The mobile robot 130 carrying a product tote 140 may arrive to the unoccupied location on the staging shelf 124 and deliver the product tote 140. The mobile robot 130 may then transition to an occupied location on the staging shelf 124, retrieve the product tote 140 and deliver the product tote 140 to the workstation 115.

Figure 5:
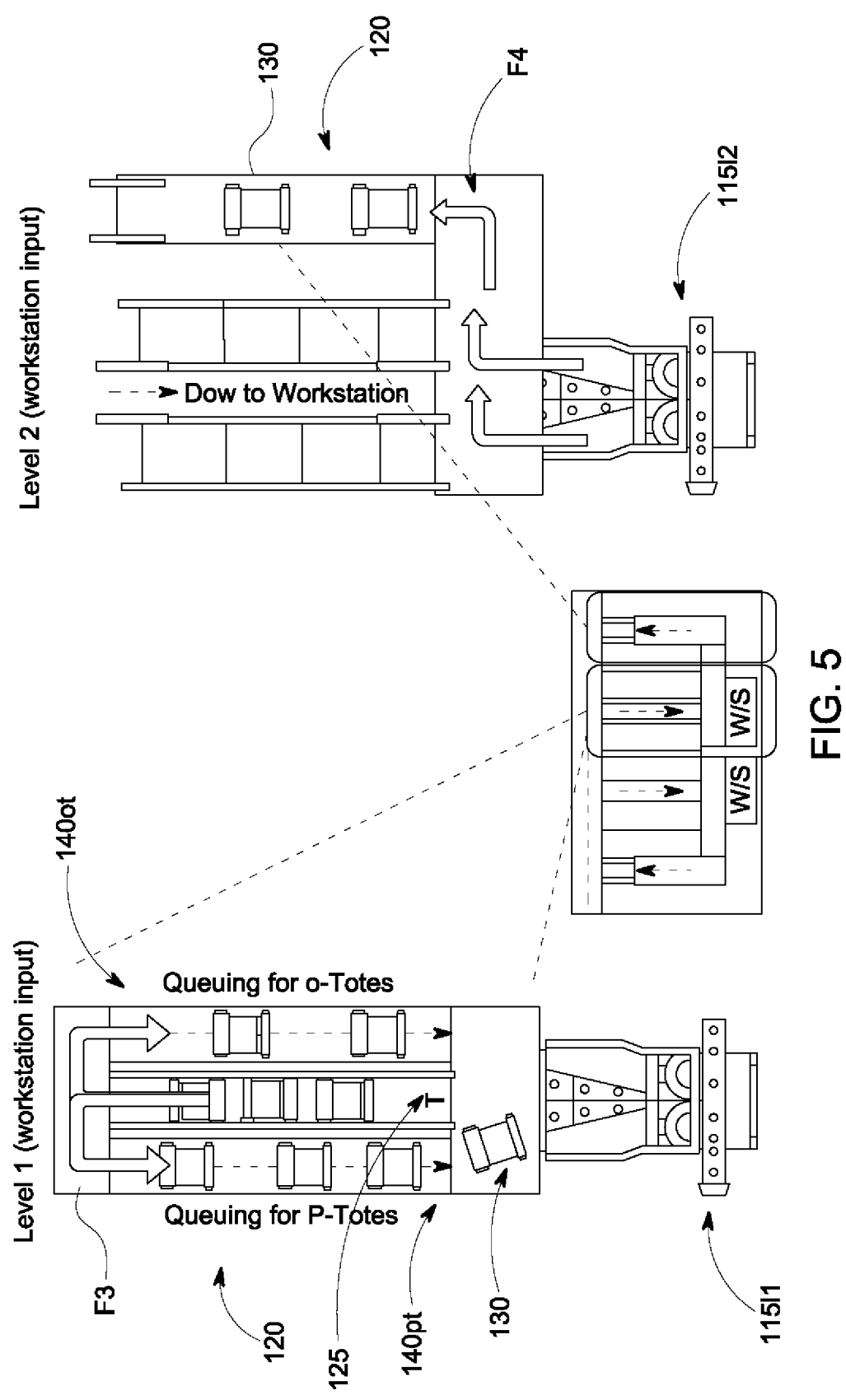
FIG. 5 shows schematic illustrations showing further aspects of an order fulfillment according to embodiments of the present technology.

FIG. 5 is schematic illustrations of an order fulfillment facility 100 in accordance with aspects of the disclosed embodiment. Referring now to FIG. 5 the workstation 115 may have a first level input workstation 115/1 and a second level output workstation 115/2. The workstation 115 may receive product totes 140pt and order totes 140ot from the staging and sequencing tower 120. In one aspect workers at the workstation 115 may manually transfer items from a product tote 140pt to an order tote 140ot under the guidance of an inventory control system at the workstation 115. In alternative embodiments any suitable automated method for transferring products from the product totes 140pt to the order totes 140ot may be used. The flow F3 of mobile robot 130 carrying product totes 140pt or order totes 140ot may transition from the staging shelf 124 to the vertical level changing tower 125, then the vertical level changing tower may position the mobile robot 130 carrying product totes 140pt or order totes 140ot to the first level input workstation 115/1. The products may be transferred from the product tote 140pt to the order tote 140ot. The flow F4 of mobile robot 130 carrying product totes 140pt or order totes 140ot may then transition from the first level input workstation 115/1 to the second level output workstation 115/2 and back to the storage structure 102 via deck structure adjacent to the sequencing tower.

Figure 6:
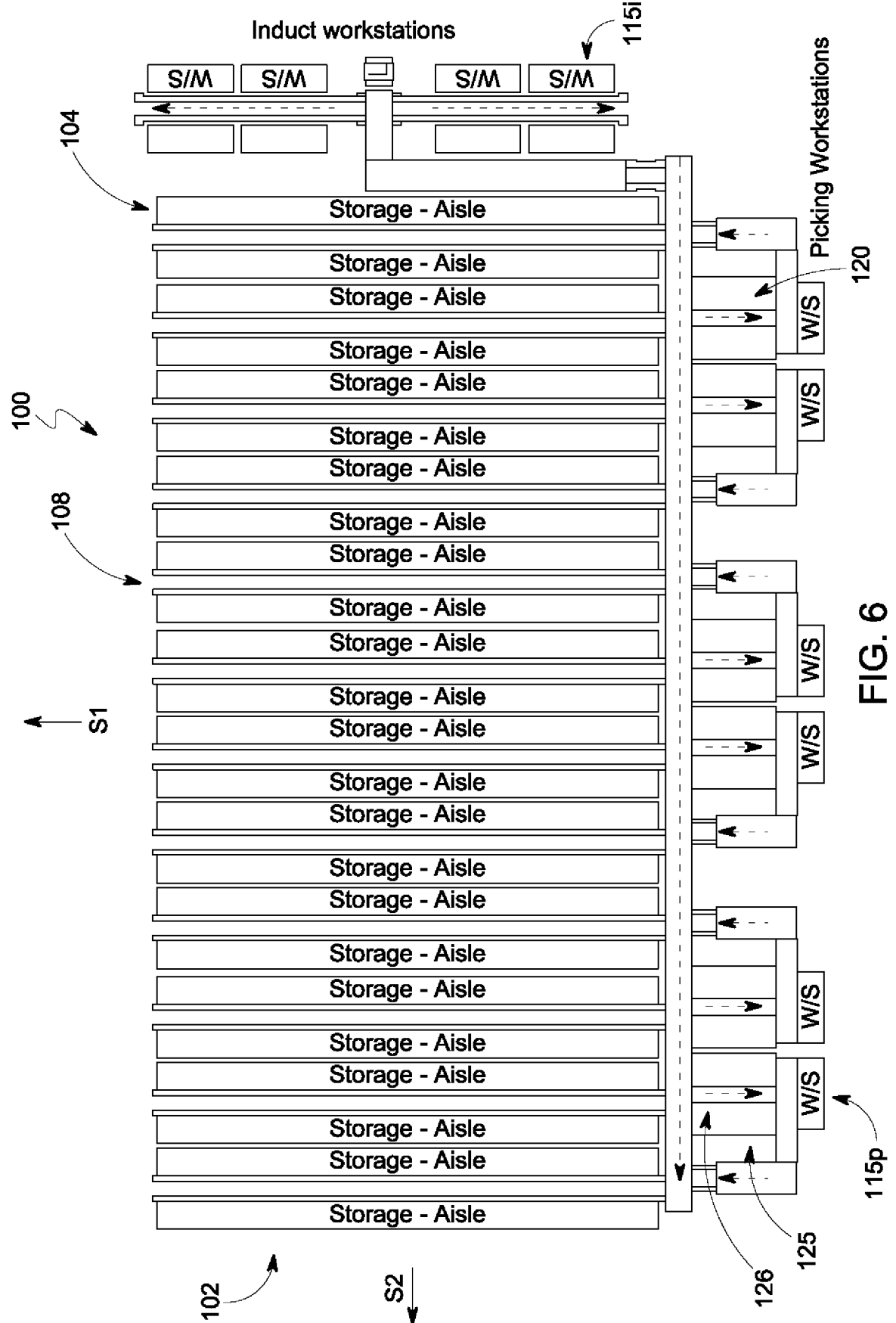
FIG. 6 shows schematic illustrations showing further aspects of an order fulfillment facility according to embodiments of the present technology.

FIG. 6 is schematic illustrations of an order fulfillment facility 100 in accordance with aspects of the disclosed embodiment. Referring now to FIG. 6 the order fulfillment facility 100 may include a modular and scalable storage structure 102, transit deck pairs 117, staging and sequencing towers 120, induction and removal workstations 115i and picking workstations 115p. In one aspect the modular and scalable storage structure 102 may increase in the S1 or S2 direction, in another aspect the modular and scalable storage structure 120 may increase in the S1 and S2 direction. The modular and scalable induction and removal workstations 115i may be added when the scalable storage structure 120 increases in the S1 direction and the modular and scalable picking workstation 115p and the transit deck pairs 117 may be added when scalable storage structure 120 increases in the S2 direction.

Figure 7A:
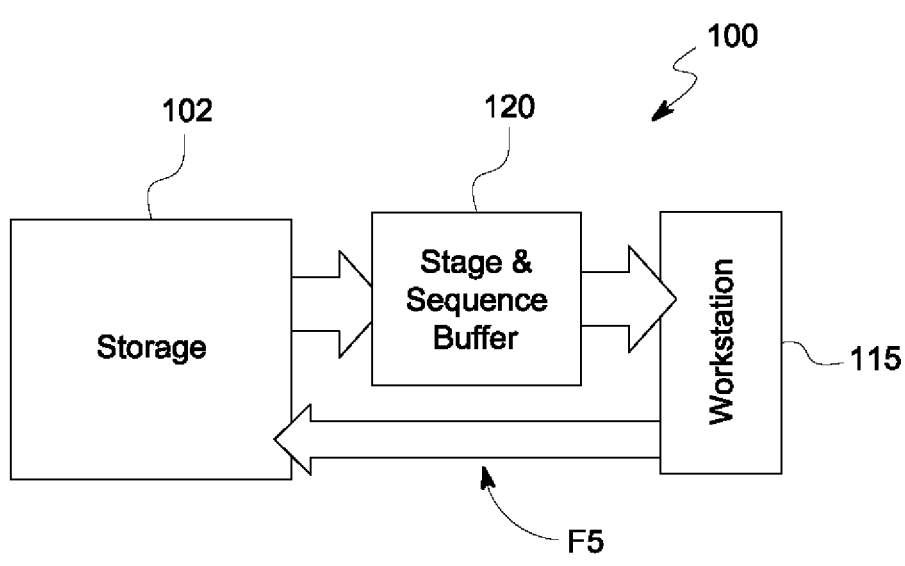
FIGS. 7A-B are schematic illustrations showing further aspects of an order fulfillment facility according to embodiments of the present technology.
Figure 7B:
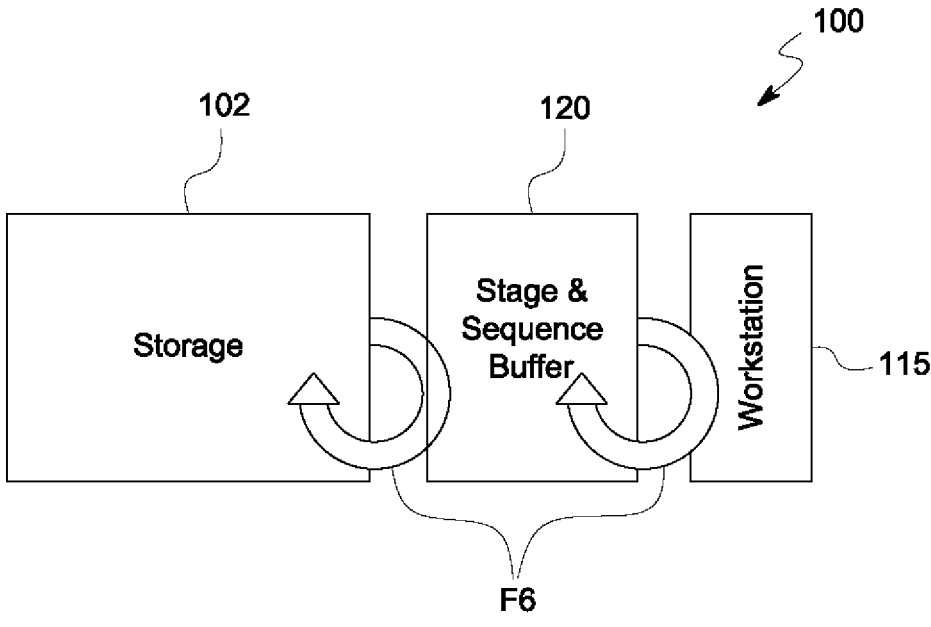

Referring now to FIGS. 7A-B there are shown schematic illustrations of an order fulfillment facility 100 in accordance with aspects of the disclosed embodiment. In each case, stage and sequence buffer (or tower) 120 is shown between storage 102 and workstation 115. Buffer 120 may be used between two asynchronous operations, or operations that can ebb and flow independent of one another. One asynchronous operation may be storage operations in storage array 102 where totes may be picked and placed by autonomous robots. Another asynchronous operation may be workstation operations where autonomous bots may bring product or order totes to workstation(s) 115 for picking orders. Asynchronous operations may include, for example any operation with potential disruption in a steady state of flow (from upstream source or at downstream destination) such as by contrast—a conveyance assembly line is a steady state whereas a decoupled work cell is not. The use of a buffer weighs the sequencing requirement vs. the ability to perform that sequencing upstream without affecting throughput. There are 3 variables for any buffer:

1. Sequence-ability: FIFO (no sequencing) vs. Group Sequencing (soft) vs. Strict Sequencing (hard)
2. Size: Driven by the level of imbalance between 2 systems and the need for sequencing
3. Throughput: Driven by the steady state continuous flow For sequencing buffers, software logic affects size and size affects throughput. There is a tradeoff, for example, the system requires strict sequencing of totes to a workstation. By way of further example, a bot has completed a task and needs a new assignment. The "next task in sequence" would be an inefficient move for the bot based on its current location. Perhaps it would be a better move for the next available bot, or the next, and total time to delivery would be better or perhaps not. Following are 3 exemplary options:

Option A: The bot is assigned the most efficient work. This results in higher bot performance (fewer bots to do the same work) but larger buffer to deal with the imbalance; OR Option B: The bot is assigned the "next task in sequence" regardless of how efficient the move may or may not be;

Option C is a hybrid, with option A as the default up to a configurable "aging threshold" where you force option B regardless of how inefficient the move is.

FIGS. 7A-B illustrate two types of stage and sequence buffers. FIG. 7A shows a continuous flow buffer where, for example, the tote may stay on the bot, and the bot "waits" for its opportunity to engage the workstation. FIG. 7B shows a handover exchange buffer where bots working between storage 102 and stage 120 operate where a given bot drops off a tote going to the workstation and retrieves a tote going back to storage. Similarly, bots working between stage 120 and workstation 115 operate where a given bot drops off a tote going to storage and retrieves a tote going to the workstation. Here, the number of bots serving the workstation or the storage can flex per demand.

FIGS. 7A-B are schematic illustrations of an order fulfillment facility 100 in accordance with aspects of the disclosed embodiment. Referring to FIG. 7A-B the order fulfillment facility 100 may include a storage structure 102, staging and sequencing tower 120 and workstation 115. The flow F5 of mobile robot 130 carrying product totes 140*pt* or order totes 140*ot* may transition from the storage structure 102 through the staging and sequencing tower 120 to the workstation 115. The product totes 140*pt* or order totes 140*ot* may stay on the mobile robot 130 while the mobile robot 130 waits for an opportunity to engage the workstation 115. The flow F6 of mobile robot 130 carrying product totes 140*pt* or order totes 140*ot* may transition between the storage structure 102 and the staging and sequencing tower 120 where the mobile robot 130 delivers the product totes 140*pt* or order totes 140*ot* to the staging and sequencing tower 120 and retrieves a product totes 140*pt* or order totes 140*ot* going back to the storage structure 102. The flow F6 of mobile robot 130 carrying product totes 140*pt* or order totes 140*ot* may also transition between the staging and sequencing tower 120 and the workstation 115 where the mobile robot 130 delivers the product totes 140*pt* or order totes 140*ot* to staging and sequencing tower 120 and retrieves a product totes 140*pt* or order totes 140*ot* going to the workstation 115.

Figures 8A, 8B:
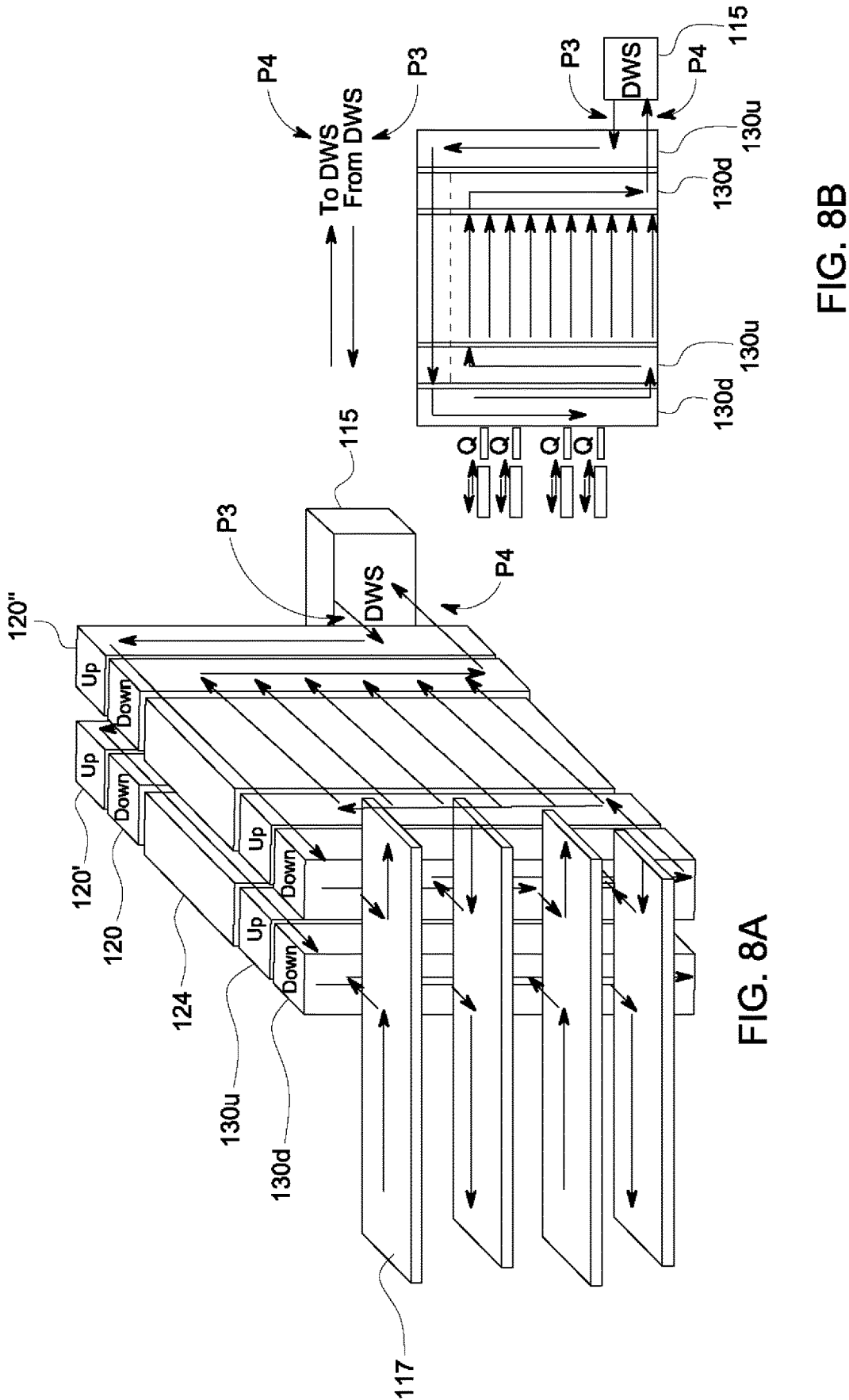
FIGS. 8A-B are schematic illustrations and perspective views showing further aspects of an order fulfillment facility according to embodiments of the present technology.

FIGS. 8A-B are schematic illustrations and perspective views of an order fulfillment facility 100 in accordance with aspects of the disclosed embodiment. The illustrations show the system may be arranged such that there is always one preferred path from any storage location to any workstation, for example the bot may go to west bank 120' or east bank 120", but both banks feed the dynamic workstation 115. Here, one preferred path may be provided from workstation 115 to any storage location where the west bank 120' may provide a path to western storage locations and the east bank 120" to eastern storage locations. The staging and sequencing tower 120 may have a vertical level changing tower 130*u* where bots travel in the up direction and a second vertical level changing tower 130*d* where bots travel in the down direction located on each end of the staging shelves 124. Transit deck pairs 117 may interface with one end of the staging and sequencing tower 120 and a dynamic workstation 115 may interface with the other end of the staging and sequencing tower 120 (storage structure 102 not shown). A path P3 may be established for a mobile robot 130 (not shown) that flows from the dynamic workstation 115 through the staging and sequencing tower 120 to the transit deck pairs 117. More specifically, path P3 begins at dynamic workstation 115 and progresses to the vertical lift 130*u*, then transitions across the staging shelves 124 to a vertical lift 130*d* and then to the transit deck 117. A path P4 may be established for a mobile robot 130 (not shown) that flows from the transit deck 117 to the vertical level changing tower 130*d*, then to vertical level changing tower 130*u*, then transitions across the staging shelves 124, then to vertical level changing tower 130*d* and then to the dynamic workstation 115.

Figures 9A, 9B:
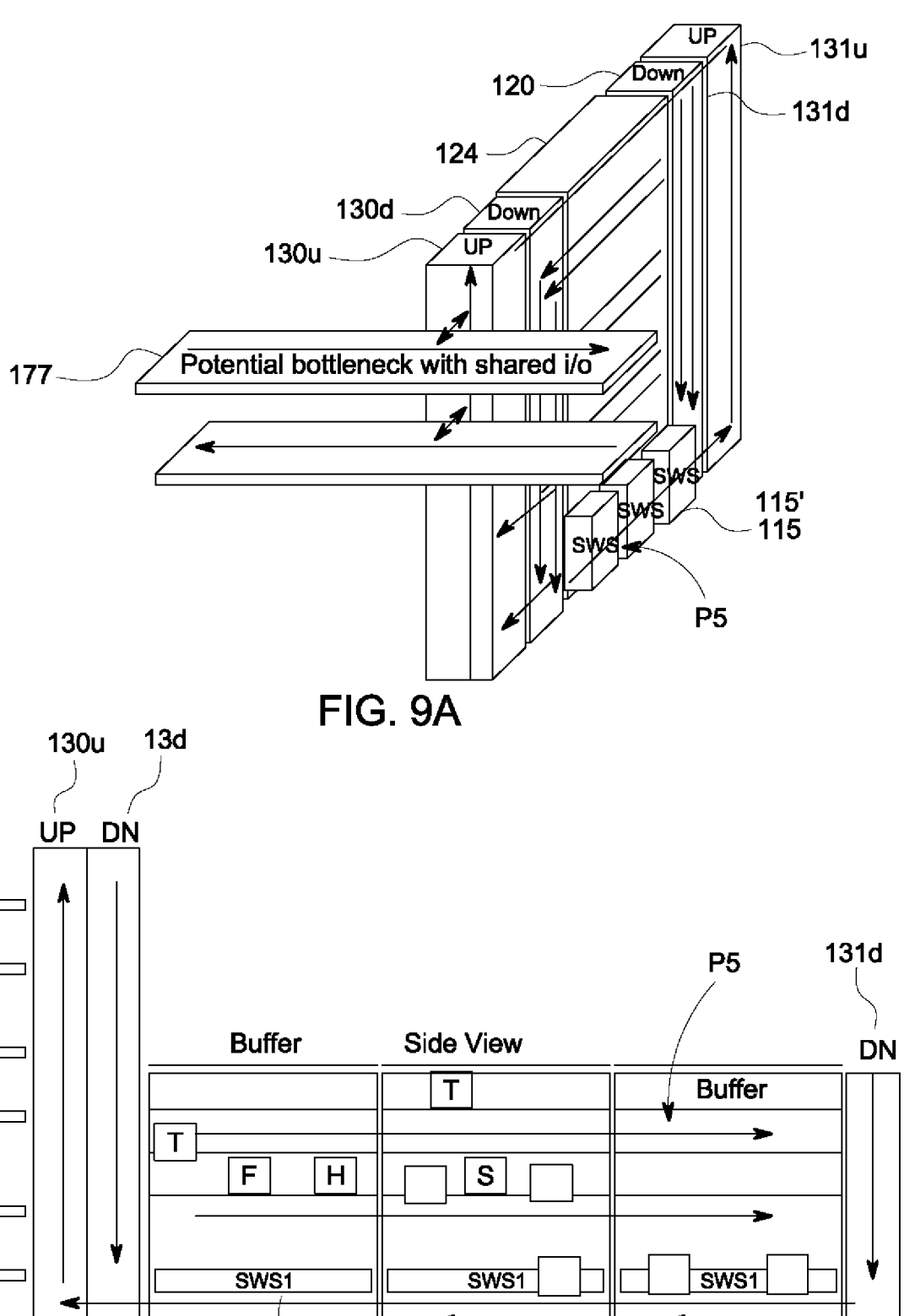
FIGS. 9A-B are schematic illustrations and perspective views showing further aspects of an order fulfillment facility according to embodiments of the present technology.

FIGS. 9A-B are schematic illustrations and perspective views of an order fulfillment facility 100 in accordance with aspects of the disclosed embodiment. Referring to FIG. 9A-B the staging and sequencing tower 120 may have a vertical level changing tower 130*u* where bots travel in the up direction and a second vertical level changing tower 130*d* where bots travel in the down direction located on each end of the staging shelves 124. Transit deck pairs 117 may interface with one end of the staging and sequencing tower 120 and a static workstation 115' may interface with the other end of the staging and sequencing tower 120 (storage structure 102 not shown). A path P5 may be established for a mobile robot 130 (not shown) that flows from the transit deck 117 to the vertical level changing tower 130*u*, then to vertical level changing tower 130*d*, then transitions across the staging shelves 124, then to vertical level changing tower 130*d* then to the static workstation 115', then transitions across the static workstations 115', then to vertical level changing tower 130*u* and then to the transit decks 117. Here, one preferred path is shown from any storage location to any static workstation location with bi-directional i/o at the tower to deck interface.

Figure 10:
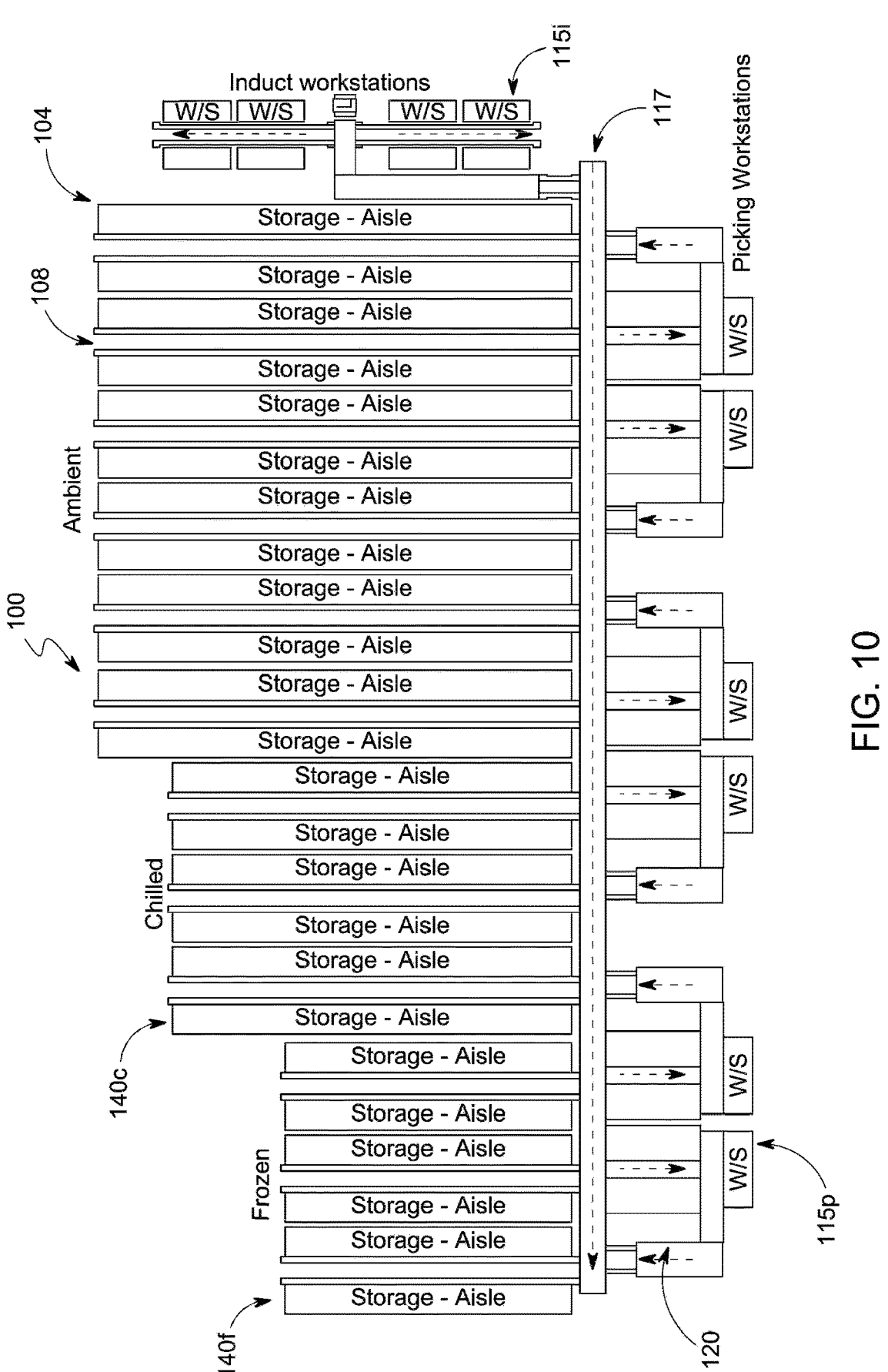
FIG. 10 is a schematic illustration showing further aspects of an order fulfillment facility according to embodiments of the present technology.

FIG. 10 is schematic illustrations of an order fulfillment facility 100 in accordance with aspects of the disclosed embodiment. Referring now to FIG. 10, the order fulfillment facility 100 may include a storage structure 102 having variable sized bays 104*a*, 104*c* and 104*f*, transit deck pairs 117, staging and sequencing tower 120, induction and removal workstations 115*i* and picking workstations 115*p*. The size of the bays 104*a*, 104*c* and 104*f* may be based on a balance of throughput of products and storage capacity. For example, in FIG. 10, a first set of bays of a first sized may be provided to store frozen goods, a second set of bays of a second size may be provided to store chilled goods, and a third set of bays of a third size may be provided to store goods at ambient temperature. Storage locations in the first and second set of bays may include refrigeration components (not shown). The sizes shown in FIG. 10 are by way of example only, and the frozen, chilled and ambient storage bays may be different sizes in different examples.

Figure 11:
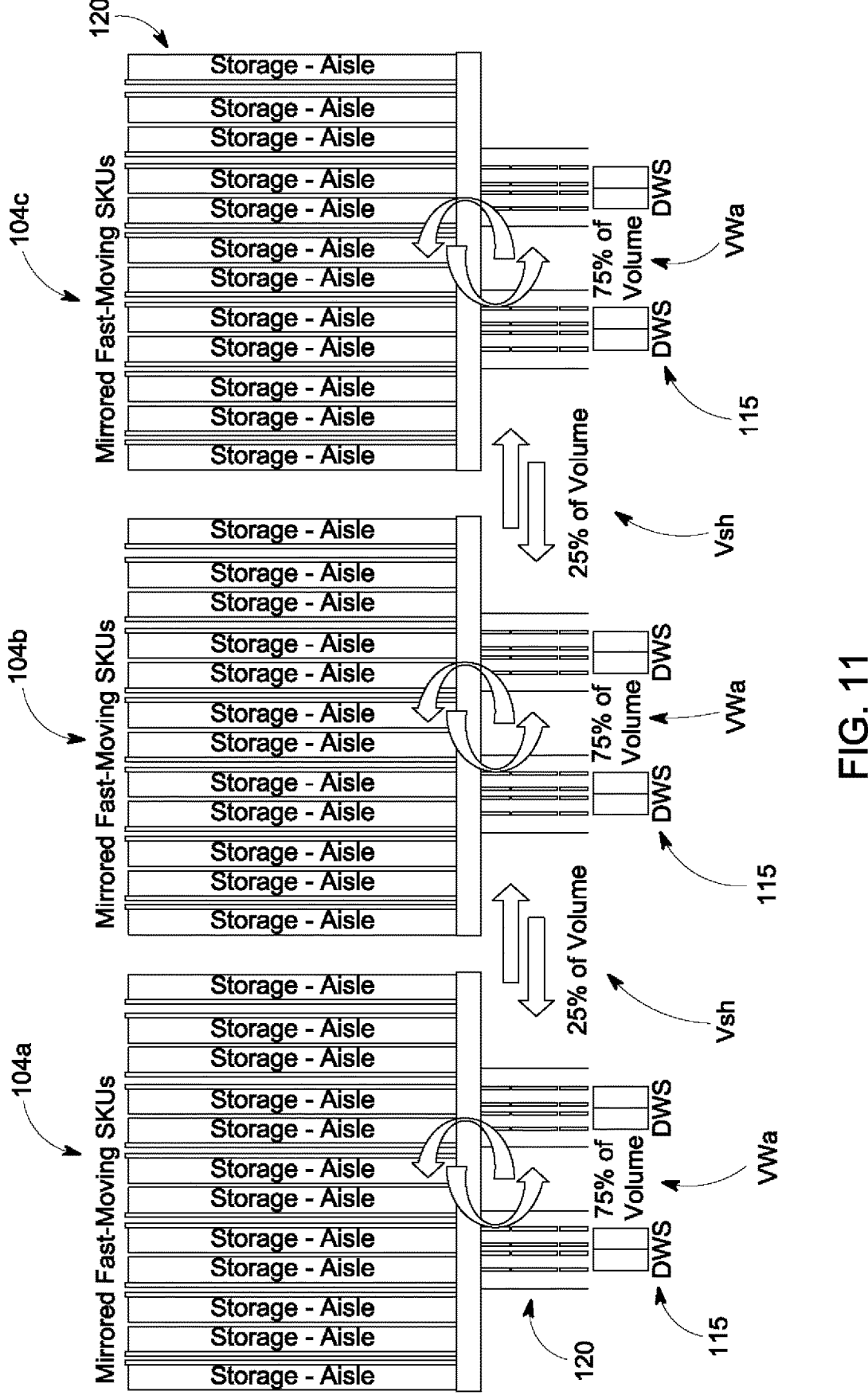
FIG. 11 is a schematic illustration showing further aspects of an order fulfillment facility according to embodiments of the present technology.

FIG. 11 is schematic illustrations of an order fulfillment facility 100 in accordance with aspects of the disclosed embodiment. Referring now to FIG. 11, the order fulfillment facility 100 may include a storage structure 102, where the storage structure 102 may have individual clusters of bays 104*a*, 104*b* and 104*c*, where each cluster may have transit deck pairs 117, staging and sequencing tower 120 and dynamic workstations 115. In one aspect each bay cluster 104*a*, 104*b* and 104*c* may process 75% of the volume VWa, VWb and VWc for that cluster and share 25% of the volume Vsh with the adjacent bay cluster. In alternative embodiments each bay cluster 104*a*, 104*b* and 104*c* may process any suitable volume VWa, VWb and VWc for that cluster and share any suitable volume Vsh with the adjacent bay cluster.

Figure 12:
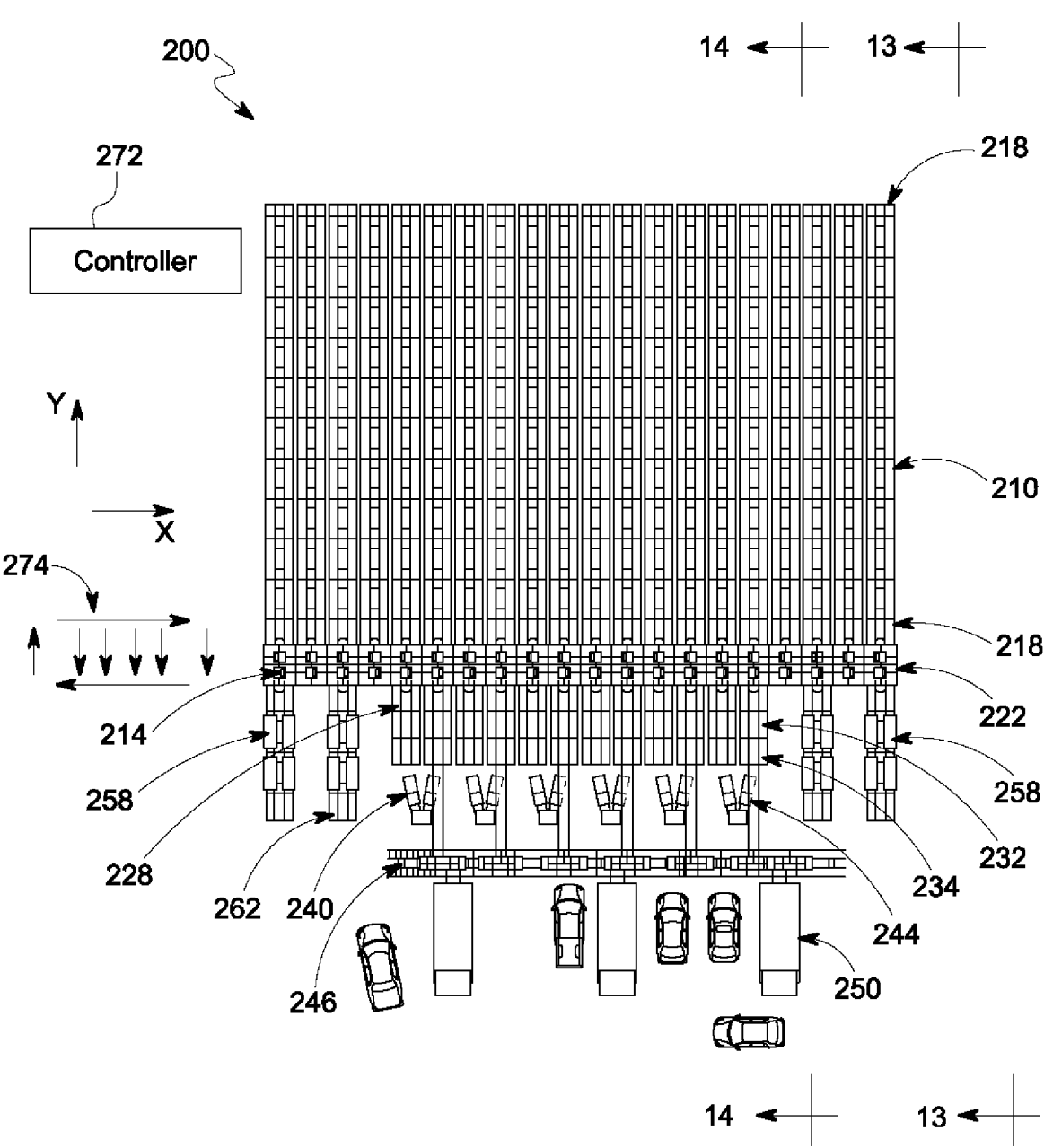
FIG. 12 is a plan view of an order fulfillment facility according to further embodiments of the present technology.
Figures 13, 14:
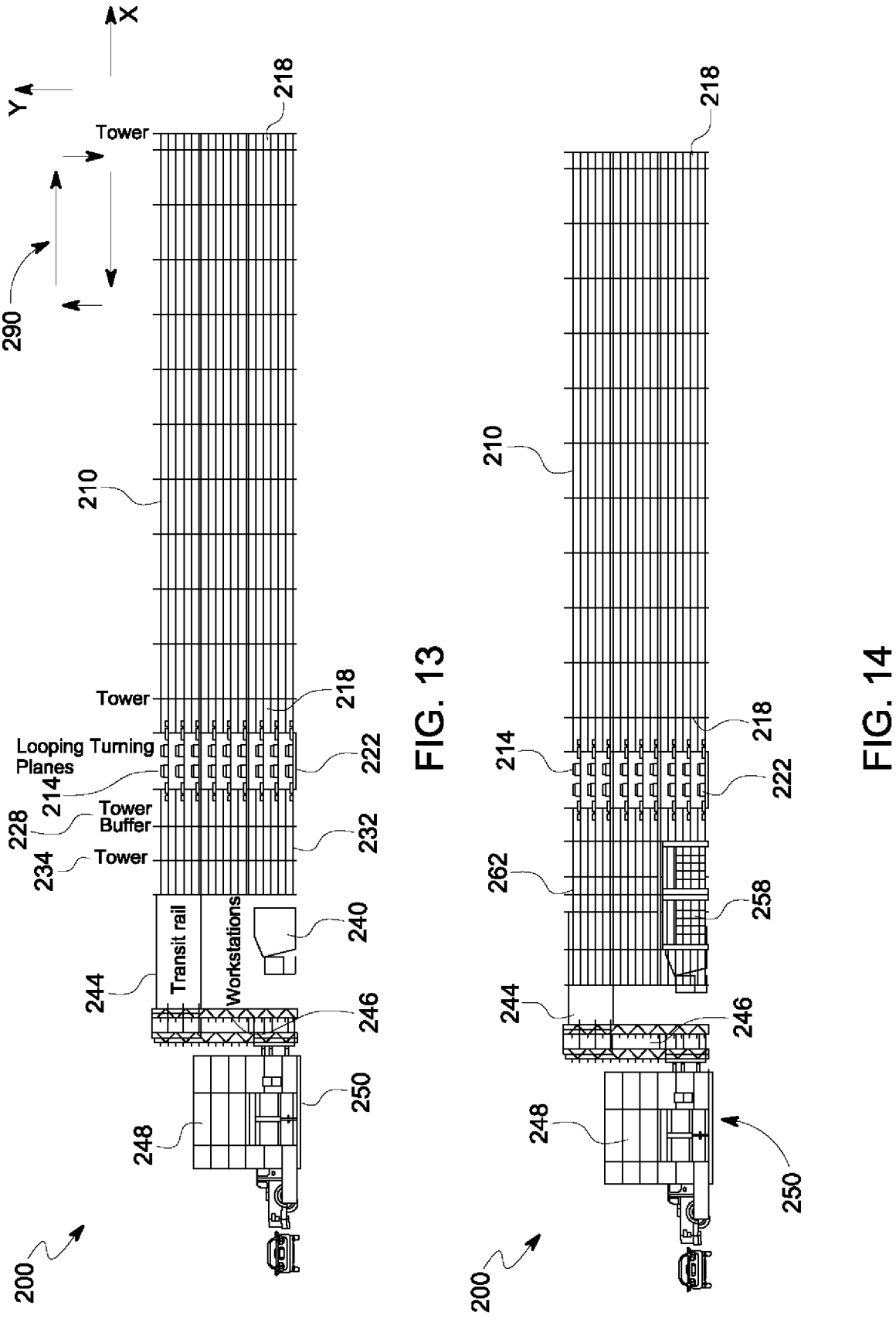
FIGS. 13 and 14 are side section and side views of an alternate order fulfillment facility according to embodiments of the present technology.
Figure 15:
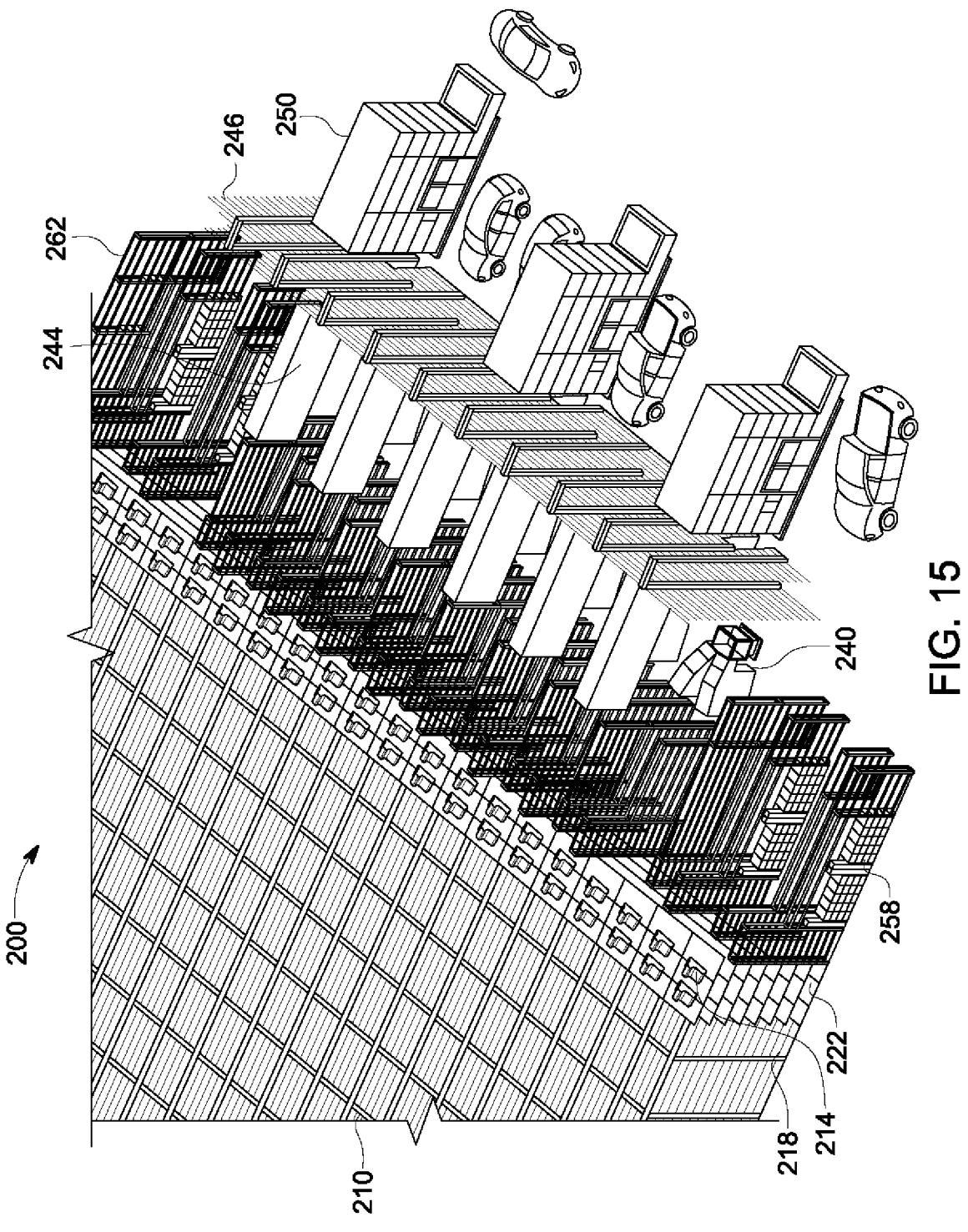
FIGS. 15 and 16 are isometric views of an alternate order fulfillment facility according to embodiments of the present technology.
Figure 16:
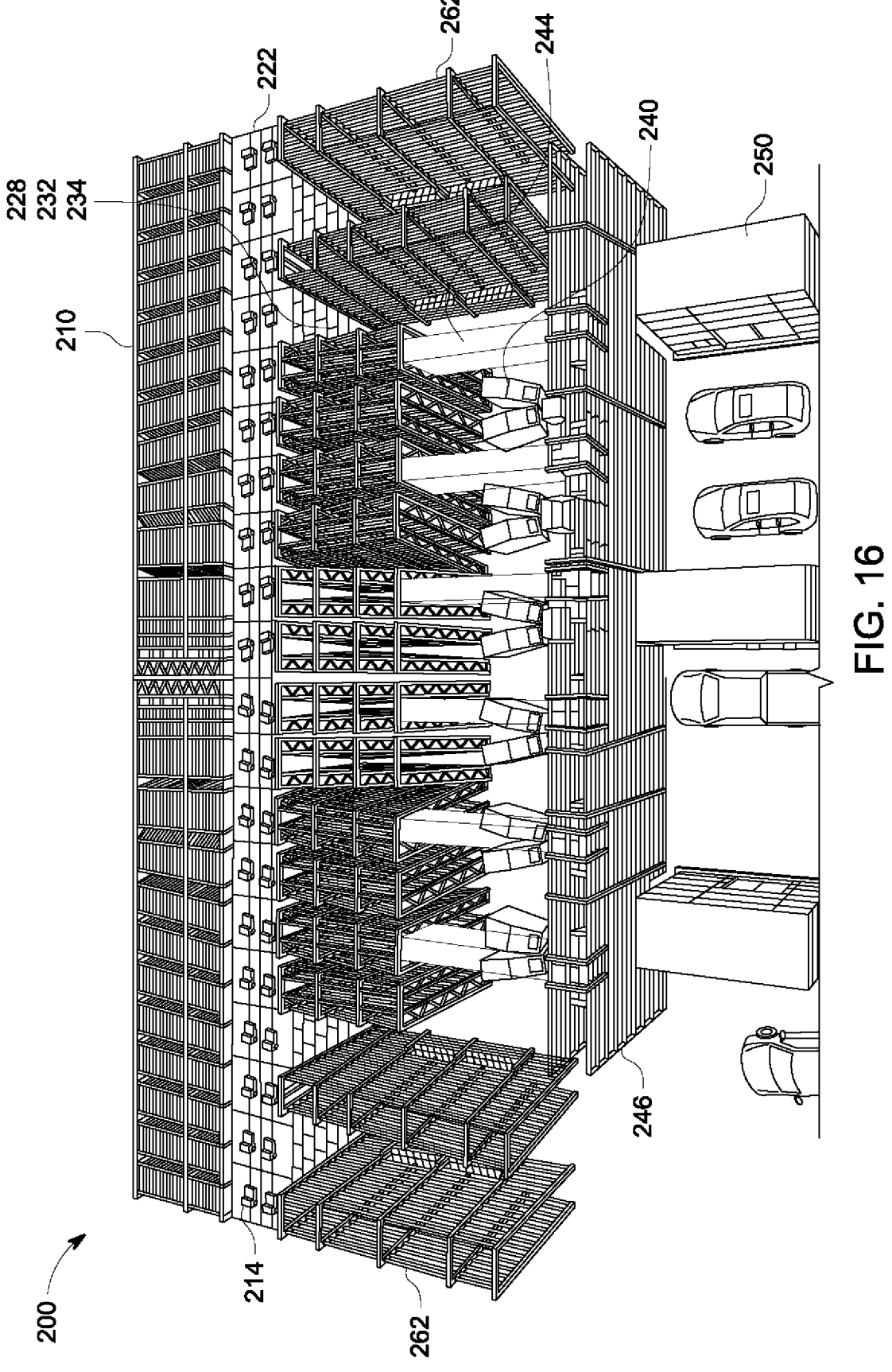

FIG. 12 is a plan view of an alternate order fulfillment facility 200 in accordance with aspects of the disclosed embodiment. FIGS. 13 and 14 are side section and side views respectively of an alternate order fulfillment facility 200 in accordance with aspects of the disclosed embodiment. FIGS. 15 and 16 are isometric views of an alternate order fulfillment facility 200 in accordance with aspects of the disclosed embodiment. Order fulfillment facility 200 has storage array 210 where product and order totes may be stored and retrieved by automated mobile robots 214. Climbing towers 218 are positioned at either end of storage structure 210 where automated mobile robots 214 can enter and climb in the towers to different levels of storage structure 210. Looping turning planes 222 are coupled to every other level of tower 218. Buffer storage 228 is coupled on the +Y end to looping turning planes 222 and on the −Y end to climbing towers 232, 234. Dynamic workstations or picking workstations 240 are shown coupled to tower 234 at different locations in the X direction where tower 234 feeds Bots 214 having order and product totes to workstations 240 to consolidate orders in order totes from successive product totes where a picker picks different SKU from successive product totes and places them in order totes to make up a given order. Product totes generally come from storage structure 210. Upon completion, order totes generally may be transported by Bots 214 to storage 210, buffer storage 228 or more typically for order tote storage and dispense to customer dispense modules 250 where dispense modules 250 provide customer access to order totes filled with the contents of a filled order. Here, bots 214 having order totes may traverse from workstation 240 to tower 234, transit rail 244, rail to dispense structure 246 and ultimately to local storage 248 within dispense module 250. Inventory may be inducted into system 200 through static workstations or rack portals 258 where induction structure 262 may have towers and rails that couple static workstations or rack portals 258 to looping turning planes 222. Static workstations or rack portals 258 allow totes to be inducted into system 200 or taken out of system 200 safely where inducted totes may be totes that have replenishment inventory or empty totes that have been cleaned, reconditioned or otherwise.

In operation, system 200 employs controller 272 to coordinate movement of Bots 214 and the transport and storage of totes within system 200 by Bots 214. Here, controller 272 may be configured to have order storage separated from product storage wherever possible. Controller 272 may be used in any of the above-described embodiments as well. Here, product storage (product totes containing inventory suitable for picking) is predominantly maintained and stored in storage structure 210 portion of system 200 upstream of buffer storage 228 and picking workstations 240. By way of contrast, order storage (order tote(s) containing multiple SKUs picked from product totes at picking workstations 240 making up a given order) of order totes may be predominantly maintained and stored in rail to dispense structure 246 and/or local storage 248 within dispense portal 250 waiting for customers to pick up the respective order at portal 250. By segregating storage in this manner, traffic overlaps may be minimized within product storage areas. Further, transit rails 244 connected to order storage 246, 248 enable direct connection of completed order tote traffic from workstations 240 without going onto in rack transit planes 222. Controller 272 may be configured to control the flow of Bots 214 to minimize the potential for congestion. In one aspect, controller 272 may be configured to control traffic on looping turning planes 222 as shown in diagram 274 where traffic on looping turning planes 222 may be designated such that a unidirectional flow is established to minimize the potential for congestion. This flow may be reversed in whole or in part, for example, by level to provide for the efficient transport of product totes in and out of storage structure 210 and/or buffer 222.

Figure 17:
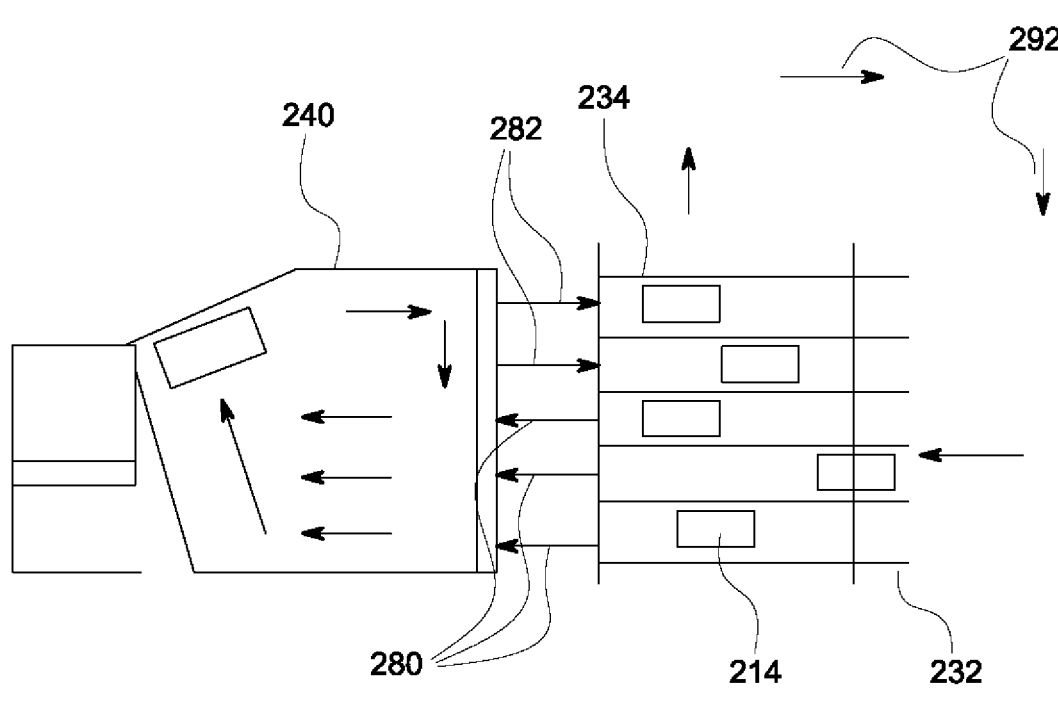
FIG. 17 is a side view of workstation in an order fulfillment facility according to embodiments of the present technology.

FIG. 17 is a side view of workstation 240 in an order fulfillment facility 200 in accordance with aspects of the disclosed embodiment. Workstations 240 are shown connected to towers/rails 234 instead of looping decks 222. By arranging the workstation as shown, 2 or more input levels 280 or output levels 282 may be provided for Bots 214 to access and depart workstation 240 as opposed to 1 input/1 output. Alternately any suitable combination may be provided, for example, 2 input levels and 1 output level or otherwise.

Figure 18:
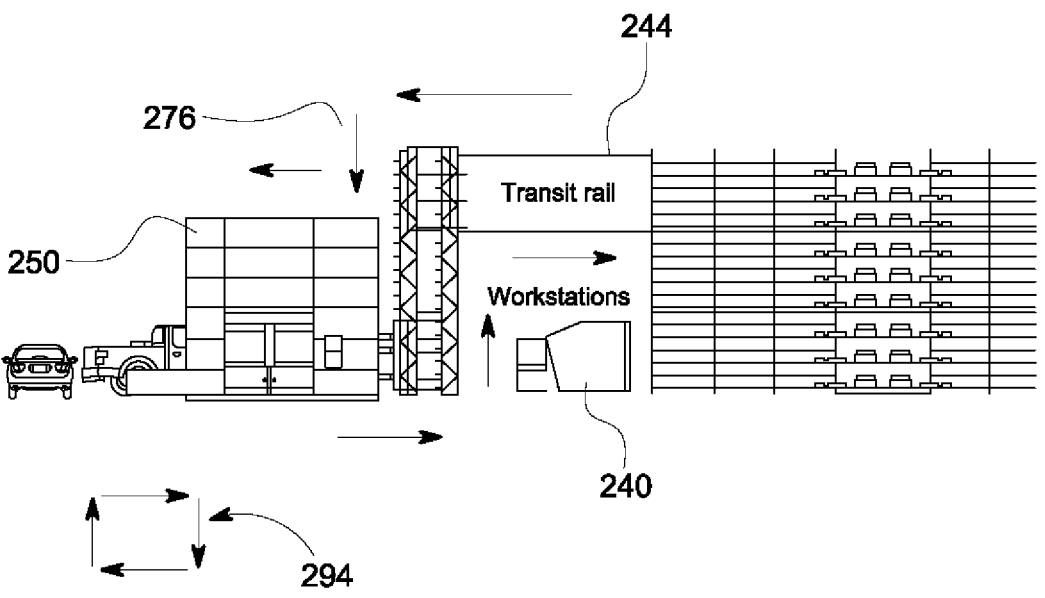
FIG. 18 is a partial sectional view of the order fulfillment facility of FIG. 13 showing Bot flow.

Referring also to FIG. 18, there is shown a partial section view as seen in FIG. 13 further illustrating flow of Bots with full or empty order totes. As seen in FIG. 18, controller 272 may be configured to control the flow of Bots 214 to minimize the potential for congestion of order totes where Bots may be directed in a unidirectional fashion from the upper rail of transit rails 244, through storage and dispense portal 250 and routed back to workstation back through the lower rail of transit rails 244. Accordingly, controller 272 may be configured to coordinate movement of Bots 214 and the transport and storage of totes within system 200 by Bots 214 where product totes may be segregated from order totes and where interconnecting loops of Bot traffic may be used in a unidirectional fashion or otherwise to minimize the potential for congestion. Here in system 200, by way of example, product totes may be segregated to storage 210 with the exception of when they are utilized for order picking at picking workstations 240 where they traverse from storage 210 via looping turning planes 222 to buffer storage 228 to workstations 240 and back via towers as explained. Similarly, order totes may be segregated to local storage 246 or 248 within dispense portal 250 after the order is picked at workstations 240 where order totes depart workstations 240 via towers 234 and transit rail 244. Similarly, controller 272 may be configured to control the flow of Bots where interconnecting loops of Bot traffic may be used in a unidirectional fashion or otherwise to minimize the potential for congestion. By way of non-limiting example, 6 exemplary loops may be provided. In alternate aspects, more or less loops may be provided. The 6 exemplary loops may be:

1. Product storage loop 290 (FIG. 13) in storage structure 210 to allow given Bots for product totes to get to the appropriate level for buffering or otherwise;
2. Looping turning planes loop 274 (FIG. 12) where traffic on looping turning planes 222 may be designated such that a unidirectional flow of Bots with products totes is established;
3. Product tote workstation loop 292 (FIG. 17) cycling Bots for product totes from the buffer through the workstation;
4. Order tote workstation loop 294 (FIG. 18) which may be similar to Product tote workstation loop 292 cycling empty order totes from order tote storage through the workstation;
5. Pre dispense order tote loop 276 (FIG. 17) where Bots for full order totes are cycled from the workstation 240 to local storage 246 or 248 within dispense portal 250; and
6. Dispense order tote loop 294 where Bots for full order totes are cycled from the buffered order tote storage 246 or 248 within dispense portal 250 to the dispense portals themselves for access to the order tote contents by customers for customer pickup at portal 250.

Accordingly, controller 272 may be configured to coordinate movement of Bots 214 and the transport and storage of totes within any suitable system, further examples of which will be described, where product totes may be segregated from order totes and where interconnecting loops of Bot traffic may be used in a unidirectional fashion or otherwise to minimize the potential for congestion. Dispense portal 250 is shown as a drive up dispense portal, for example, where customers may drive up to portal 250 and remove order contents as disclosed in U.S. Patent Application No. 63/127,762 filed on Dec. 18, 2020 and entitled "micro-fulfillment center with automated dispense and return using mobile robots and method of operating same" incorporated by reference herein in its entirety. In alternate aspects and as will be described, dispense portal 250 may be a rack based dispense where order totes are dispensed to removeable racks, the racks configured for transport by truck or otherwise as disclosed in U.S. Patent Publication No. 2022-0219904, entitled "TRANSPORT RACK AND TRANSPORT RACK DOCKING INTERFACE," published Jul. 14, 2022 incorporated by reference herein in its entirety.

Figure 19:
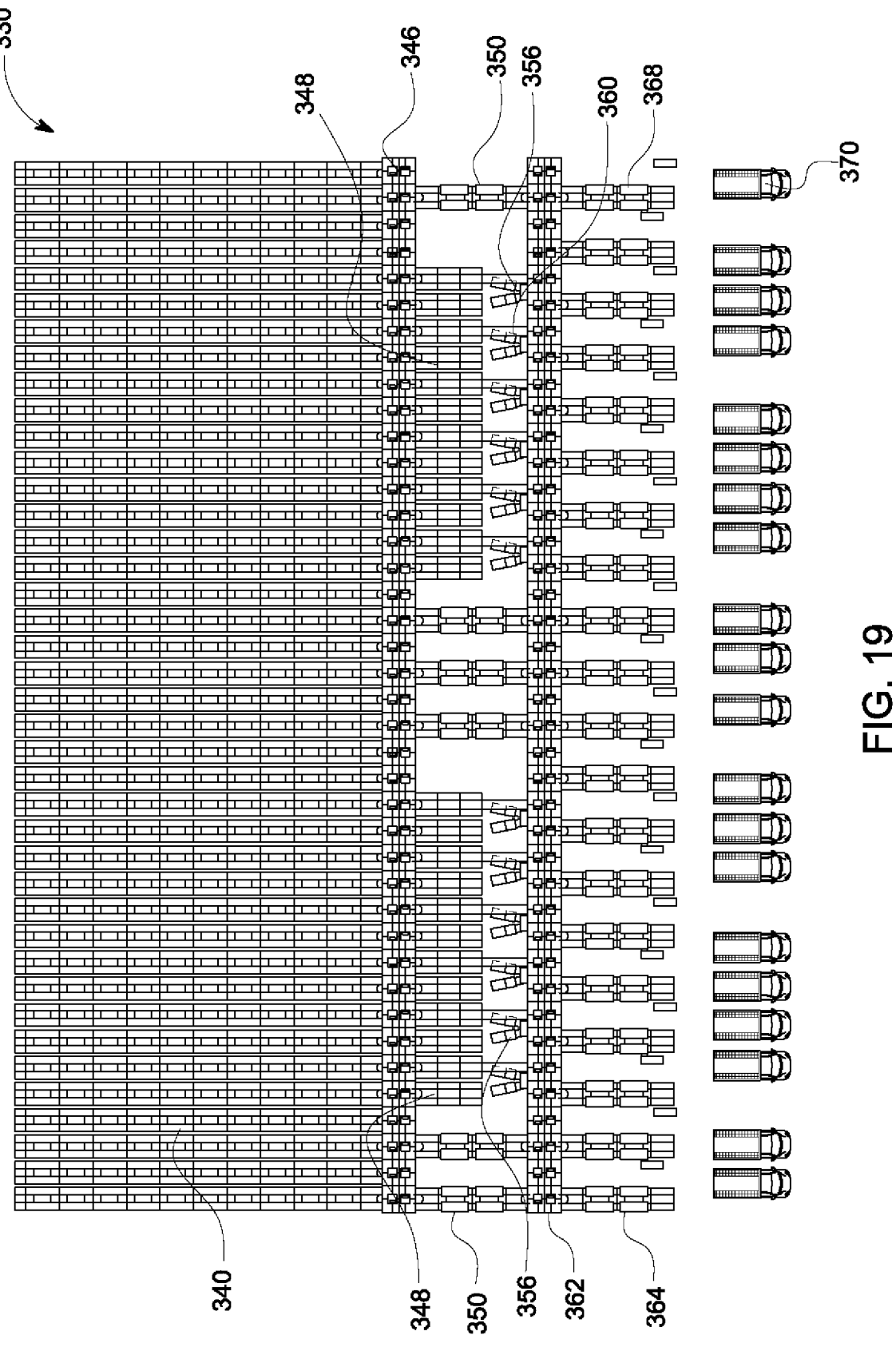
FIGS. 19-21 are plan views, side views and partial isometric views of an order fulfillment facility according to alternative embodiments of the present technology.
Figure 20:
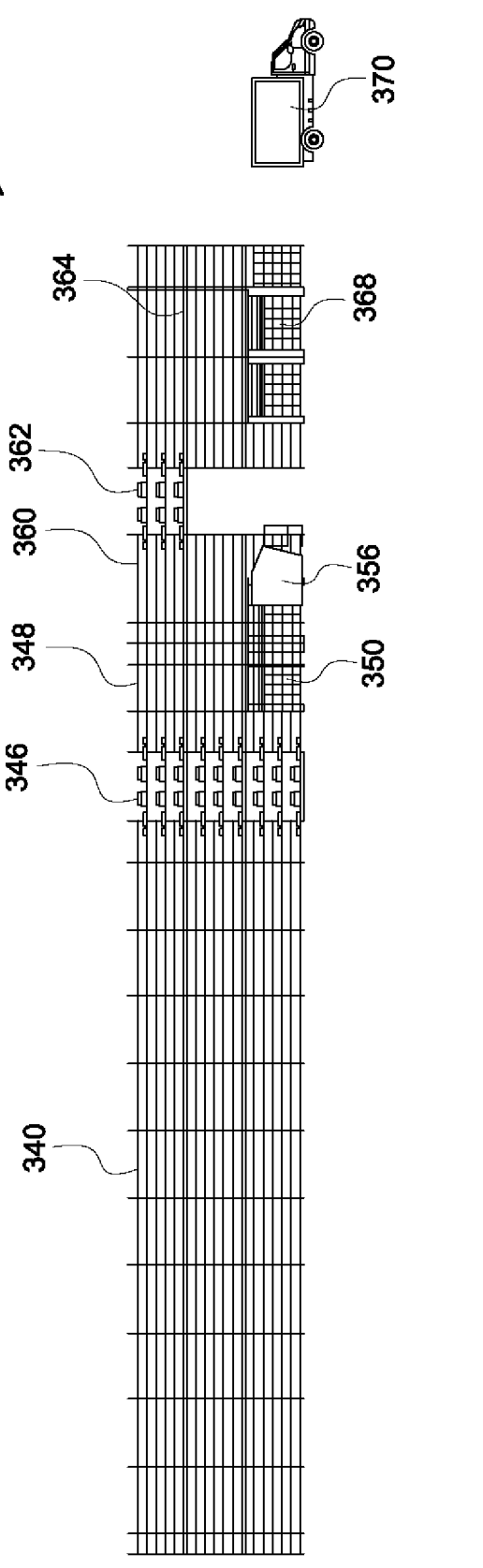
Figure 21:

Referring now to FIG. 19, there is shown a top view of an alternate embodiment system 330. Referring also to FIG. 20, there is shown a side view of system 330. Referring also to FIG. 21, there is shown a partial isometric view of system 330. System 330 has product tote storage 340, looping turning planes 346 connected to product tote storage 340 on one side and product tote buffer 348 on the other. Inventory may be inducted into system 330 through static workstations or rack portals 350 that are coupled to looping turning planes 346. Picking workstations 356 are coupled to product tote buffer 348 via towers. Transit rails 360 couple towers from picking workstations 356 to looping turning planes 362 which may be provided to allow totes to be routed to order tote buffer storage 364 for dispense at rack portals 368. Here, racks with completed orders may be moved to trucks 370 for delivery. System 330 may utilize a controller to coordinate movement of Bots and the transport and storage of totes within the system as disclosed or as applied by one skilled, where product totes may be segregated from order totes and where interconnecting loops of Bot traffic may be used in a unidirectional fashion or otherwise to minimize the potential for congestion.

Figure 22A:
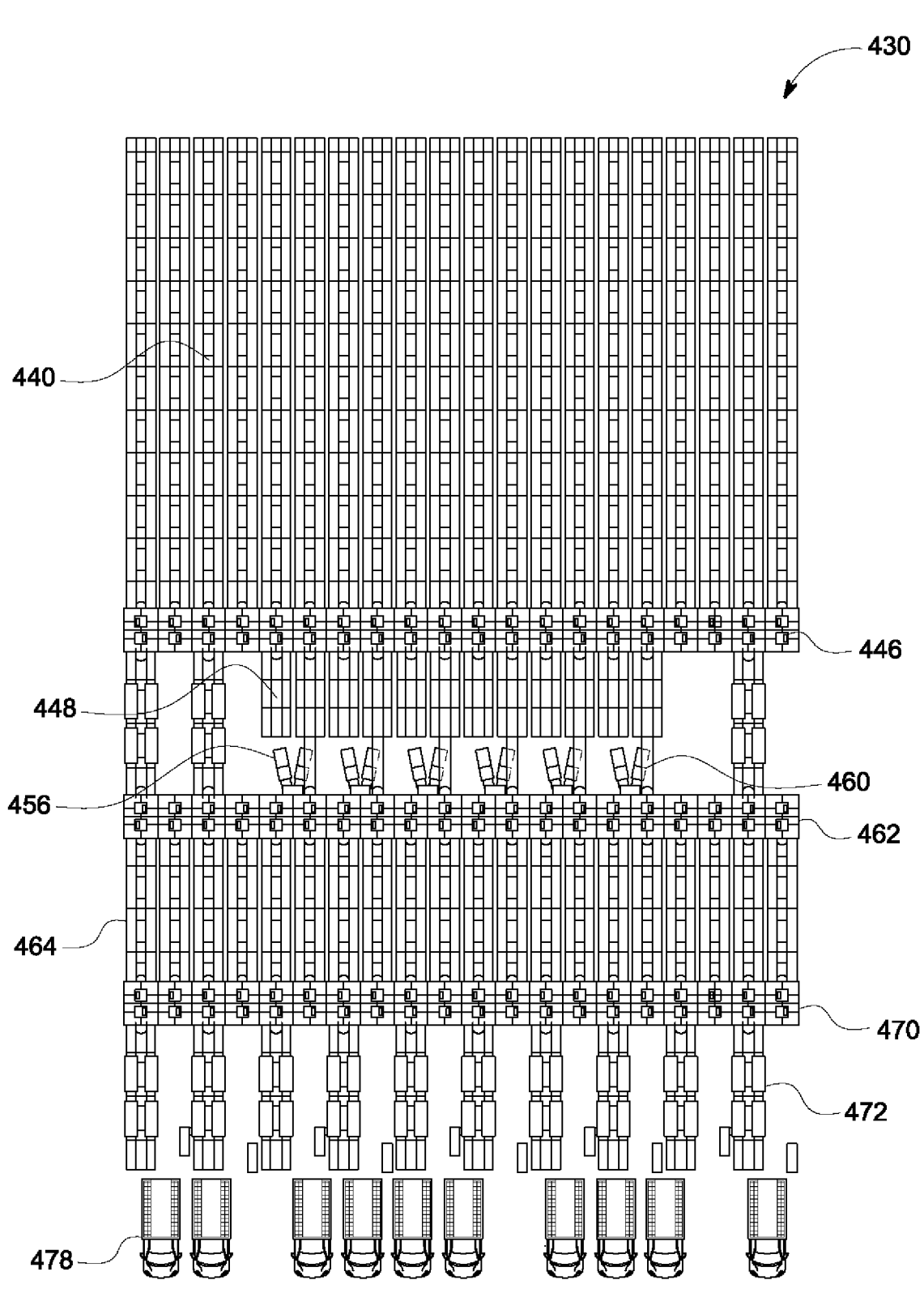
FIGS. 22A-23 are plan views, isometric views and side views of an order fulfillment facility according to further alternative embodiments of the present technology.
Figure 22B:
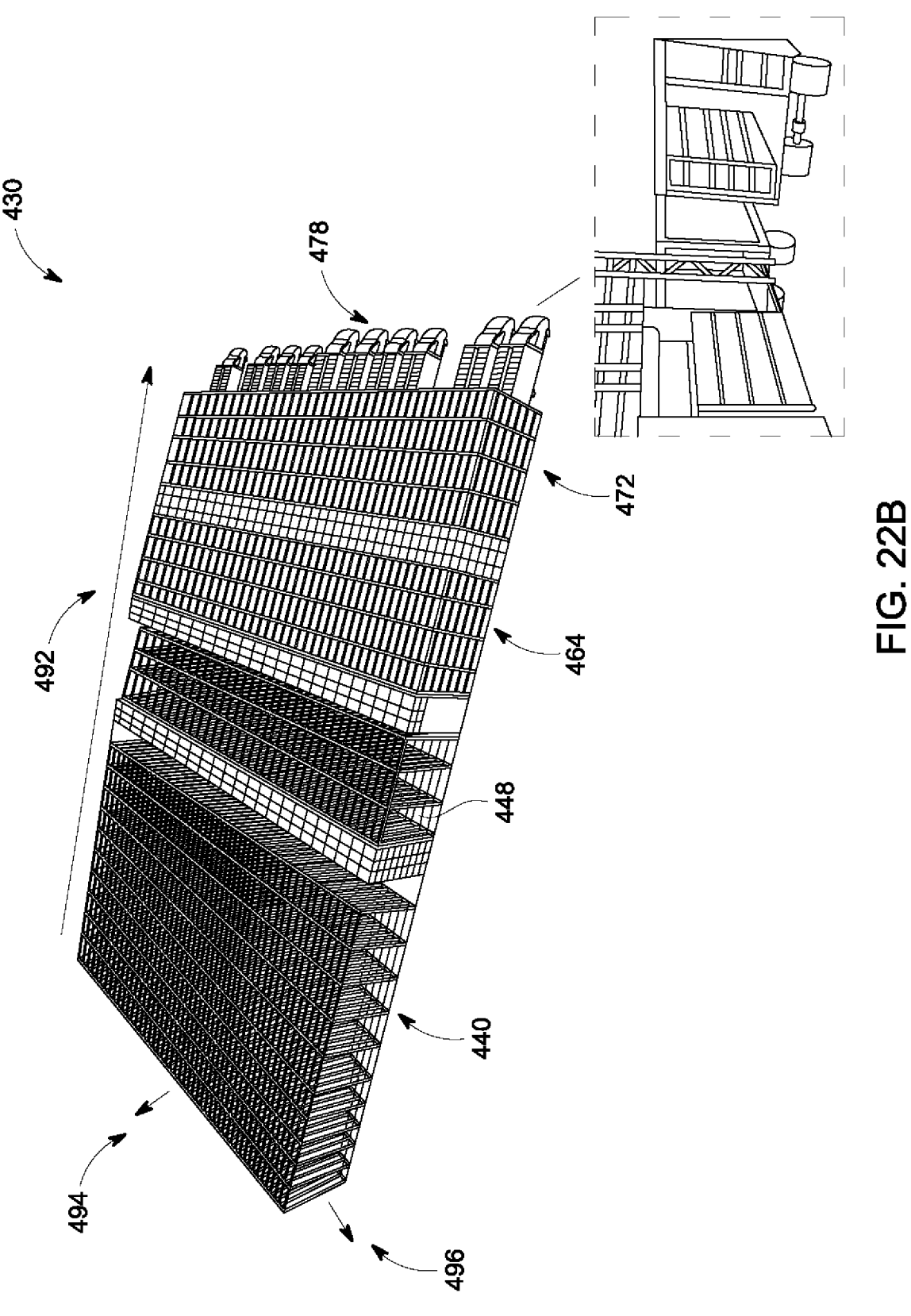
Figure 23:
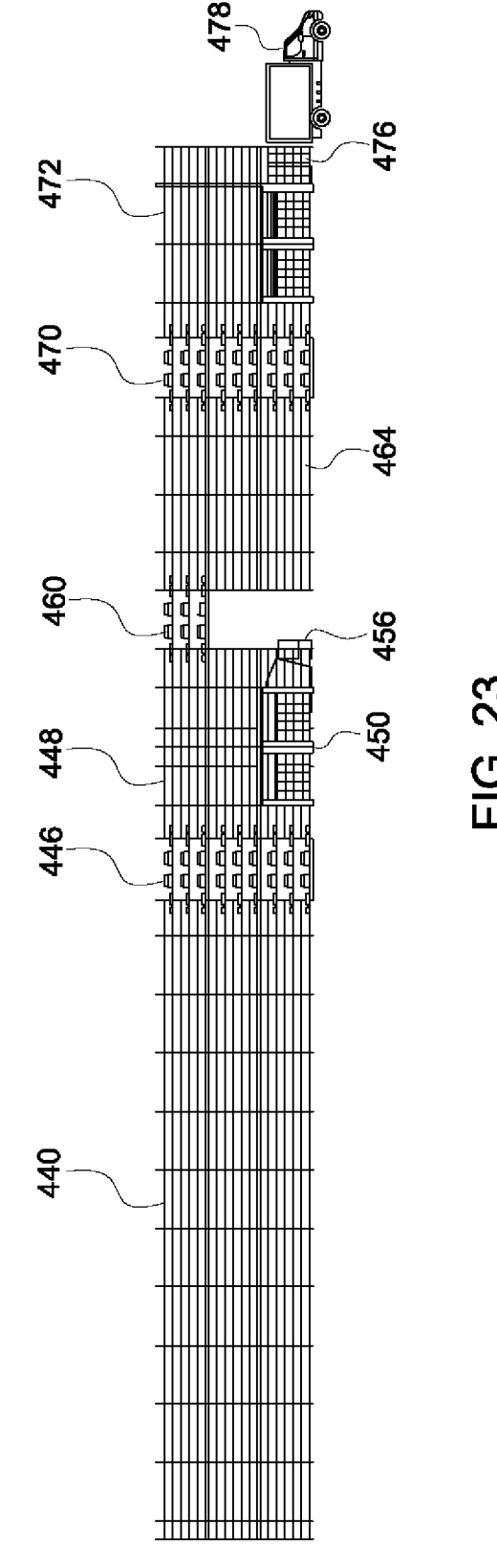

Referring now to FIG. 22A, there is shown a top view of an alternate embodiment system 430. Referring also to FIG. 22B, there is shown an isometric view of alternate embodiment system 430. Referring also to FIG. 23, there is shown a side view of system 430. System 430 has product tote storage 440, looping turning planes 446 connected to product tote storage 440 on one side and product tote buffer 448 on the other. Inventory may be inducted into system 430 through static workstations or rack portals 450 that are coupled to looping turning planes 446. Picking workstations 456 are coupled to product tote buffer 448 via towers. Transit rails 460 couple towers from picking workstations 456 to looping turning planes 462 which may be provided to allow totes to be routed to order tote buffer storage 464 buffered for dispense. Tote buffer storage 464 may or may not have tower(s) for Bot climbing and may be further coupled to looping turning planes 470 which are in turn coupled to rack portals 472 which may or may not have local storage and towers in addition to the rack storage. Here, racks 476 with completed orders may be moved to trucks 478 for delivery. As compared to system 330, system 430 has order tote storage 464 which may buffer order totes and dispatch them to racks via decks 470 and portals 472. System 430 may utilize a controller to coordinate movement of Bots and the transport and storage of totes within the system as disclosed or as applied by one skilled, where product totes may be segregated from order totes and where interconnecting loops of Bot traffic may be used in a unidirectional fashion or otherwise to minimize the potential for congestion. As seen in FIG. 22B, high volume flow 492 of product migrates from product totes in storage structure 440 to trucks 478 for delivery where capacity may be expanded 494, for example by adding tote storage locations to add SKU's or incremental inventory to the system or replicating 496 elements of the system to add capacity.

In accordance with an example embodiment, an apparatus may be provided with a controller comprising at least one processor and at least one non-transitory memory including computer program code, the at least one memory and the computer program code configured to, with the at least one processor, cause the apparatus to stage and sequence mobile robots and totes as disclosed through system 100.

Figure 24:
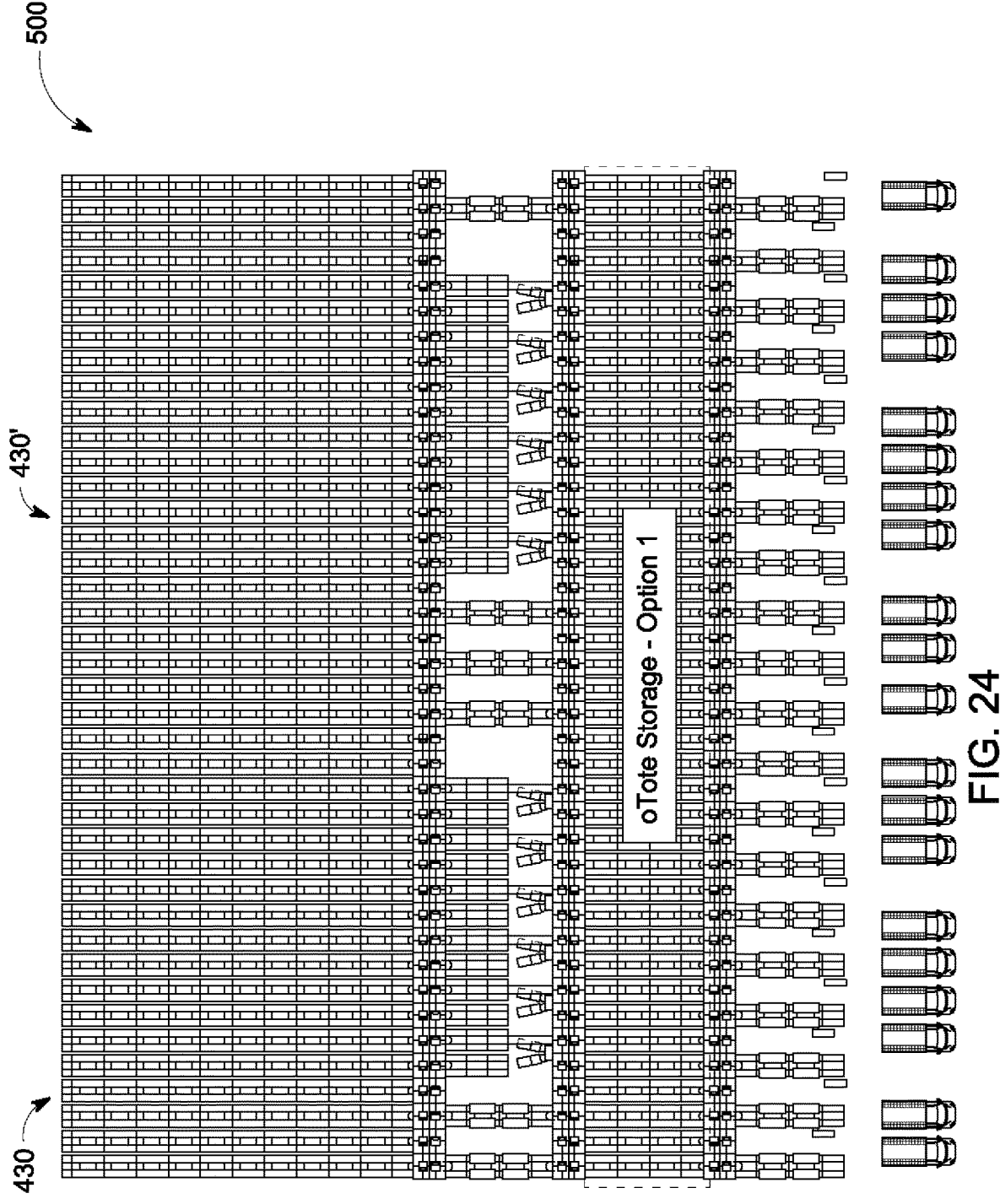
FIG. 24 is a top view of an order fulfillment facility according to further embodiments of the present technology.

Referring also to FIG. 24, there is shown a top view of system 500. Here, system 430 may be provided with an additional system 430' similar to system 430 where order capacity needs to be increased. Here order tote storage and dispense capability is also increased but where the system 500 has the flexibility to share between systems 430, 430', for example, product totes from system 430 may be directed to system 430' and vice versa. Similarly, order totes from system 430 may be directed to system 430' and vice versa.

Figure 25:
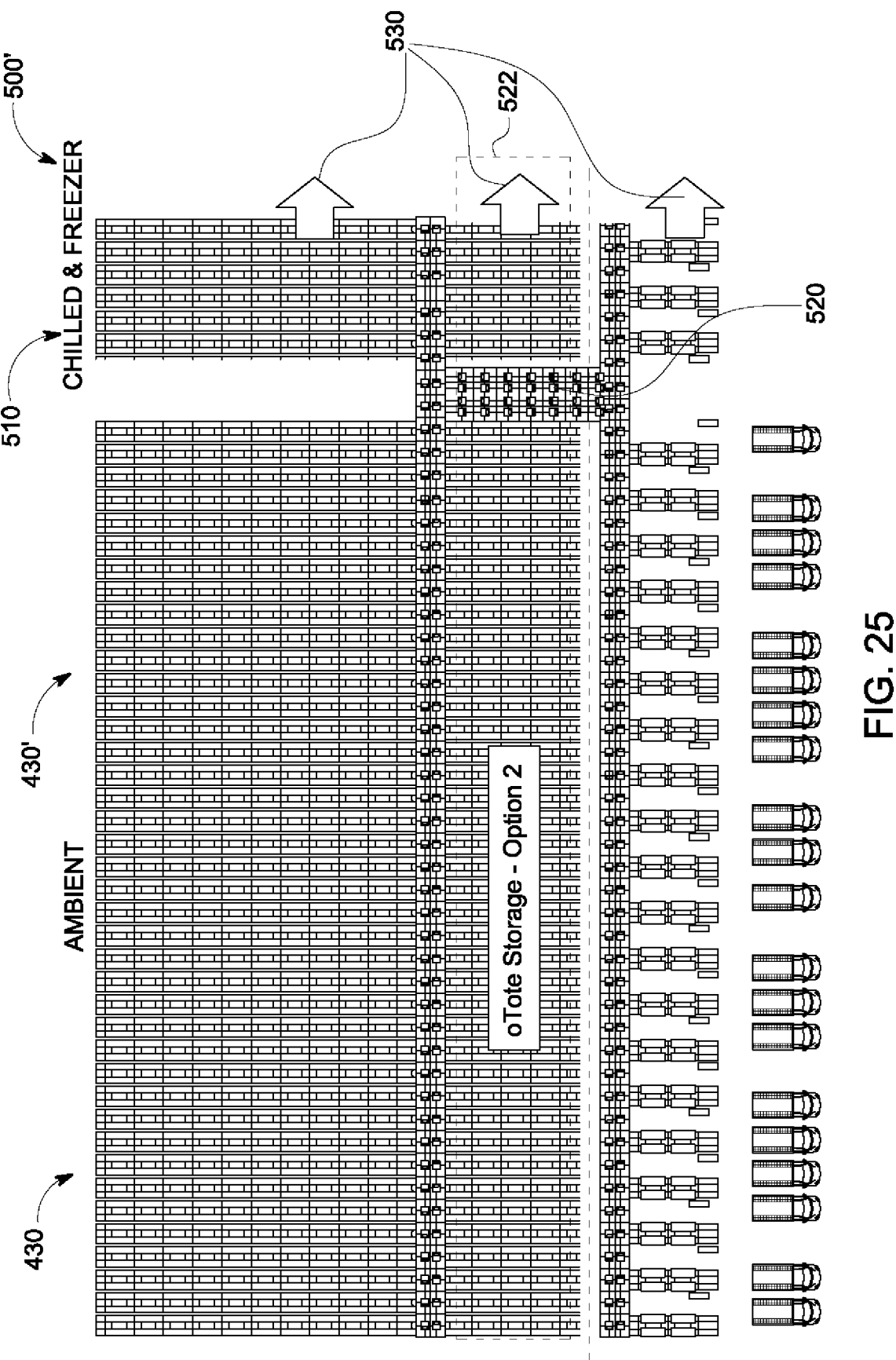
FIG. 25 is a top view of an order fulfillment facility according to further embodiments of the present technology.
Figure 26:
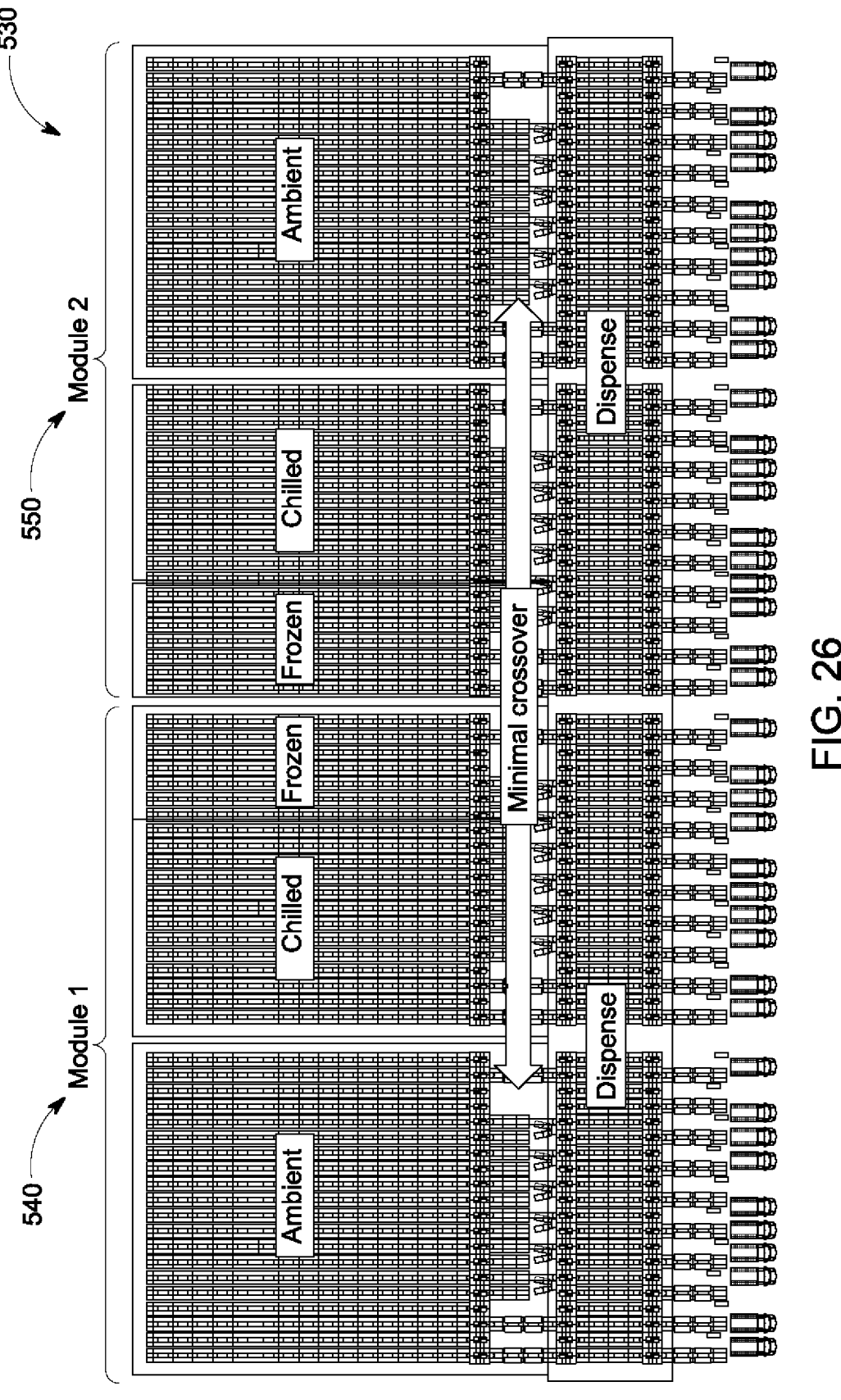
FIG. 26 is a top view of an order fulfillment facility according to further embodiments of the present technology.

Referring also to FIG. 25 there is shown a top view of system 500'. Here, system 430 may be provided with an additional system 430' similar to system 430 where order capacity needs to be increased. Further system 510 may be added having features similar to system 430 but capable of handling chilled and/or frozen goods and where order capacity needs to be increased to include chilled or frozen goods. Here order tote storage 522 and dispense capability is also increased but where the system 500' has the flexibility to share between systems 430, 430', 510, for example, product totes from system 430 may be directed to system 430' and/or 510 and vice versa. Similarly, order totes from system 430 may be directed to system 430' and/or 510 and vice versa. System 510 is shown coupled to system 430' via extension of looping turning planes and addition of looping turning planes 520 which may be overhead or otherwise. Similarly, system 500' may be extended 530 as capacity is needed. By way of example, FIG. 26 shows system 530 having substantially mirrored inventory between modules 540, 542 but with minimal crossover between modules 540, 542. Here, the systems 540, 542 may operate substantially in parallel effectively doubling the order fulfillment capacity.

In accordance with an example embodiment a non-transitory program storage device readable by a machine may be provided, such as memory, for example, tangibly embodying a program of instructions executable by the machine for performing operations, the operations comprising: calculating routing of mobile robots and totes to stage and sequence mobile robots and totes as disclosed through system 100.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In summary, the present technology relates to an automated order fulfillment system, comprising mobile robots configured to transport totes carrying goods, the automated order fulfillment system comprising: a storage structure accessible by the mobile robots and comprising storage locations configured to store the totes received from the mobile robots; one or more workstations accessible by the mobile robots and configured to receive totes from the mobile robots for processing of orders for goods; and a staging and sequencing buffer contiguous with the storage structure, the staging and sequencing buffer comprising staging locations for storing the totes, the staging and sequencing buffer configured to provide a buffer for totes transferred from the storage structure to be processed at the one or more workstations.

In another example, the present technology relates to a method of fulfilling orders for goods in an automated order fulfillment system, comprising: storing totes including the goods in a storage structure by mobile robots; transferring totes from the storage structure to a staging and sequencing buffer comprising staging locations by the mobile robots; and transferring totes from the staging and sequencing buffer to a workstation for fulfilling product orders by the mobile robots, the staging and sequencing buffer buffering totes to be transferred to the workstation.

In a further example, the present technology relates to an automated order fulfillment system, comprising mobile robots configured to transport totes carrying goods, the automated order fulfillment system comprising: a storage structure accessible by the mobile robots and comprising storage locations configured to store product totes of the totes received from the mobile robots, the product totes storing inventory for fulfilling orders; a dispensing module comprising local storage locations configured to store order totes of the totes received from the mobile robots, the order totes storing inventory received from one or more product totes; one or more workstations accessible by the mobile robots and configured to receive the product totes and the order totes from the mobile robots for transfer of goods from the product totes to the order totes; and a staging and sequencing buffer comprising staging locations for storing the product totes from the storage structure enroute to the one or more workstations; wherein the product totes travel in a first unidirectional loop between the storage structure, the staging and sequencing buffer and the one or more workstations; and wherein the order totes travel in a second unidirectional loop between the local storage of the dispensing module and the one or more workstations.

In another example, the present technology relates to an automated order fulfillment system, comprising mobile robots configured to transport totes carrying goods, the automated order fulfillment system comprising: a storage structure accessible by the mobile robots and comprising storage locations configured to store the totes received from the mobile robots; one or more pairs of decks, mobile robots entering and exiting the storage structure from the one or more pairs of decks, mobile robots traveling in a first direction in a first deck of a pair of the one or more pairs of decks, and mobile robots traveling in a second direction in a second deck of the pair of decks; one or more workstations accessible by the mobile robots and configured to receive totes from the mobile robots for processing of orders for goods; a staging and sequencing buffer contiguous with the storage structure, the staging and sequencing buffer comprising staging locations for storing the totes, the staging and sequencing buffer configured to provide a buffer for totes transferred from the storage structure to be processed at the one or more workstations; and a controller for implementing unidirectional flow through the one or more pairs of decks and the staging and sequencing buffer.

The foregoing detailed description has been presented for purposes of illustration and description. It is not intended to be exhaustive or to limit the description to the precise form disclosed. Many modifications and variations are possible in light of the above teaching. The described embodiments were chosen in order to best explain the principles of the claimed system and its practical application to thereby enable others skilled in the art to best utilize the claimed system in various embodiments and with various modifications as are suited to the particular use contemplated. It is intended that the scope of the method be defined by the claims appended hereto.

What is claimed is:

1. An automated order fulfillment system, comprising mobile robots configured to transport totes carrying goods, the automated order fulfillment system comprising:
   a storage structure accessible by the mobile robots and comprising storage locations configured to store the totes received from the mobile robots;
   one or more workstations accessible by the mobile robots and configured to receive totes from the mobile robots for processing of orders for goods; and
   a staging and sequencing buffer contiguous with the storage structure, the staging and sequencing buffer being separate and distinct from the storage locations of the storage structure and comprising staging locations for storing the totes, the staging and sequencing buffer is configured to provide a buffer for totes transferred from the storage structure to be processed at the one or more workstations.

2. The automated order fulfillment system of claim 1, further comprising a rack portal configured to receive a rack of totes into the storage structure.

3. The automated order fulfillment system of claim 1, further comprising an automated dispense module comprising a dispense portal for making goods accessible to a customer.

4. The automated order fulfillment system of claim 1, wherein the storage structure is scalable in a length direction and/or width direction.

5. The automated order fulfillment system of claim 1, wherein the storage structure is segregated into ambient storage locations and refrigerated storage locations.

6. The automated order fulfillment system of claim 1, wherein the staging and sequencing buffer comprises several levels of staging locations, and wherein the staging and sequencing buffer further comprises vertical level changing towers.

7. The automated order fulfillment system of claim 6, wherein the vertical level changing towers comprise first and second vertical level changing towers, the mobile robots traveling in a first direction in the first vertical level changing tower, and the mobile robots traveling in a second, opposite direction in the second vertical level changing tower.

8. The automated order fulfillment system of claim 1, further comprising one or more decks enabling travel of the mobile robots between the storage structure and the staging and sequencing buffer.

9. The automated order fulfillment system of claim 8, wherein the one or more decks comprise first and second decks, the mobile robots traveling in a first direction on the first deck, and the mobile robots traveling in a second direction on the second deck opposite the first direction.

10. A method of fulfilling orders for goods in an automated order fulfillment system, comprising:
   (a) storing totes including the goods in a storage structure by mobile robots;
   (b) transferring totes from the storage structure to a staging and sequencing buffer that is separate and distinct from storage locations of the storage structure and comprises staging locations by the mobile robots; and (c) transferring totes from the staging and sequencing buffer to a workstation for fulfilling product orders by the mobile robots, the staging and sequencing buffer buffering totes to be transferred to the workstation.

11. The method of claim 10, further comprising the step of operating the mobile robots to travel in a unidirectional loop between storage structure, the staging and sequencing buffer and the workstation.

12. The method of claim 10, further comprising the steps of depositing a first tote into the staging and sequencing buffer and picking up a second tote from within the staging and sequencing buffer before exiting the staging and sequencing buffer.

13. The method of claim 10, wherein said step (b) of transferring totes from the storage structure to a staging and sequencing buffer occurs asynchronously with said step (c) of transferring totes from the staging and sequencing buffer to a workstation.

14. An automated order fulfillment system, comprising mobile robots configured to transport totes carrying goods, the automated order fulfillment system comprising:

a storage structure accessible by the mobile robots and comprising storage locations configured to store product totes of the totes received from the mobile robots, the product totes storing inventory for fulfilling orders;

a dispensing module comprising local storage locations configured to store order totes of the totes received from the mobile robots, the order totes storing inventory received from one or more product totes;

one or more workstations accessible by the mobile robots and configured to receive the product totes and the order totes from the mobile robots for transfer of goods from the product totes to the order totes; and a staging and sequencing buffer comprising staging locations for storing the product totes from the storage structure enroute to the one or more workstations;

wherein the product totes travel in a first unidirectional loop between the storage structure, the staging and sequencing buffer and the one or more workstations; and wherein the order totes travel in a second unidirectional loop between the local storage of the dispensing module and the one or more workstations.

15. The automated order fulfillment system of claim 14, wherein the first and second loops have no overlap except within the one or more workstations.

16. The automated order fulfillment system of claim 14, further comprising one or more pairs of decks, mobile robots entering and exiting the staging and sequencing buffer from each of the one or more pairs of decks.

17. The automated order fulfillment system of claim 16, wherein the storage structure comprises multiple segregated regions, each region of the multiple segregated regions being serviced by a pair of decks of the one or more pairs of decks.

18. An automated order fulfillment system, comprising mobile robots configured to transport totes carrying goods, the automated order fulfillment system comprising:

a storage structure accessible by the mobile robots and comprising storage locations configured to store the totes received from the mobile robots;

one or more pairs of decks, mobile robots entering and exiting the storage structure from the one or more pairs of decks, mobile robots traveling in a first direction in a first deck of a pair of the one or more pairs of decks, and mobile robots traveling in a second direction in a second deck of the pair of decks;

one or more workstations accessible by the mobile robots and configured to receive totes from the mobile robots for processing of orders for goods;

a staging and sequencing buffer contiguous with the storage structure, the staging and sequencing buffer being separate and distinct from the storage locations of the storage structure and comprising staging locations for storing the totes, the staging and sequencing buffer configured to provide a buffer for totes transferred from the storage structure to be processed at the one or more workstations; and a controller for implementing unidirectional flow through the one or more pairs of decks and the staging and sequencing buffer.

19. The automated order fulfillment system of claim 18, wherein the staging and sequencing buffer further comprises vertical level changing towers for transferring totes to different levels of the staging and sequencing buffer.

20. The automated order fulfillment system of claim 19, wherein the controller implements a unidirectional flow through the vertical level changing towers.

* * * * *